US012323973B2

(12) United States Patent
Jiang et al.

(10) Patent No.: US 12,323,973 B2
(45) Date of Patent: Jun. 3, 2025

(54) UPLINK TRANSMISSION METHOD AND APPARATUS

(71) Applicant: FUJITSU LIMITED, Kawasaki (JP)

(72) Inventors: Qinyan Jiang, Beijing (CN); Tsuyoshi Shimomura, Yokohama (JP); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 363 days.

(21) Appl. No.: 17/885,745

(22) Filed: Aug. 11, 2022

(65) Prior Publication Data
US 2022/0394741 A1 Dec. 8, 2022

Related U.S. Application Data

(63) Continuation of application No. PCT/CN2020/090709, filed on May 15, 2020.

(30) Foreign Application Priority Data

Feb. 14, 2020 (WO) ................ PCT/CN2020/075390

(51) Int. Cl.
*H04W 72/1268* (2023.01)
*H04L 27/26* (2006.01)
(Continued)

(52) U.S. Cl.
CPC ..... *H04W 72/1268* (2013.01); *H04L 27/2605* (2013.01); *H04W 72/23* (2023.01); *H04W 74/0833* (2013.01)

(58) Field of Classification Search
CPC ............ H04W 72/1268; H04W 72/23; H04W 74/0833
See application file for complete search history.

(56) References Cited

U.S. PATENT DOCUMENTS

2019/0223227 A1 7/2019 Jiang et al.
2020/0021420 A1 1/2020 Li et al.
(Continued)

FOREIGN PATENT DOCUMENTS

CN 108633059 A 10/2018
CN 110536380 A 12/2019
(Continued)

OTHER PUBLICATIONS

International Search Report and Written Opinion of the International Searching Authority issued by the China National Intellectual Property Administration for corresponding International Patent Application No. PCT/CN2020/090709, mailed on Nov. 19, 2020, with a partial English translation.

(Continued)

*Primary Examiner* — Won Tae C Kim
(74) *Attorney, Agent, or Firm* — Myers Wolin, LLC

(57) ABSTRACT

An uplink transmission method and apparatus. The method includes: receiving by a terminal equipment indication information, wherein the indication information does not include an indication field used for indicating RB set, the indication information scheduling uplink transmission on an uplink bandwidth part including at least two resource block sets; and transmitting the uplink transmission on at least one predefined or preconfigured resource block set.

16 Claims, 21 Drawing Sheets

(51) Int. Cl.
*H04W 72/23* (2023.01)
*H04W 74/0833* (2024.01)

(56) References Cited

U.S. PATENT DOCUMENTS

| | | | |
|---|---|---|---|
| 2020/0037245 | A1 | 1/2020 | Lu et al. |
| 2020/0163088 | A1 | 5/2020 | Ji et al. |
| 2021/0058940 | A1* | 2/2021 | Choi ............... H04L 5/0092 |
| 2021/0160775 | A1 | 5/2021 | Zhang et al. |
| 2021/0167930 | A1* | 6/2021 | Jeon ............... H04L 27/2607 |
| 2021/0315019 | A1* | 10/2021 | Wang ............... H04W 74/0833 |

FOREIGN PATENT DOCUMENTS

| | | |
|---|---|---|
| CN | 110784914 A | 2/2020 |
| WO | 2019/094781 A2 | 5/2019 |
| WO | 2019/094781 A9 | 5/2019 |
| WO | 2019/095232 A1 | 5/2019 |
| WO | 2019/095337 A1 | 5/2019 |
| WO | 2019/139436 A1 | 7/2019 |

OTHER PUBLICATIONS

International Search Report and Written Opinion of the International Searching Authority issued by the China National Intellectual Property Administration for corresponding International Patent Application No. PCT/CN2020/075390, mailed on Nov. 18, 2020, with an English translation.

Samsung, "Uplink signal and channel design for NR-U", Agenda Item: 7.2.2.1.3, 3GPP TSG-RAN WG1 Meeting #99, R1-1912448, Reno, USA, Nov. 18-22, 2019.

Ericsson, "FL Summary #2 for [100b-e-NR-unlic-NRU-ULSignalsChannels-01] Email discussion/approval", Agenda Item: 7.2.2.1.3, 3GPP TSG-RAN WG1 Meeting #100bis-e, R1-2003055, e-Meeting, Apr. 20-30, 2020.

Nokia, "Introduction of NR-U", 3GPP TSG-RAN WG1 Meeting #99, R1-1913181, Draft Change Request, 38.214 CR re—Current version: 15.7.0, Reno, USA, Nov. 18-22, 2019.

Ericsson, "Feature lead summary for UL Signals and Channels", Agenda Item: 7.2.2.1.3, 3GPP TSG-RAN WG1 Meeting #98b, R1-1913521, Chongqing, China, Aug. 14-20, 2019.

Notice of Reasons for Refusal issued by the Japan Patent Office for corresponding Japanese Patent Application No. 2022-548566, mailed on Aug. 1, 2023, with an English translation.

Ad-hoc Chair (Ericsson), "Chairman's notes of AI 7.2.2 NR-Based Access to Unlicensed Spectrum", Agenda Item: 7.2.2, 3GPP TSG-RAN WG1 Meeting #99, Tdoc R1-1913383, Reno, Nevada, USA, Nov. 18-22, 2019.

Notice of Preliminary Rejection issued by the Korean Intellectual Property Office for corresponding Korean Patent Application No. 10-2022-7031336, mailed on Jan. 14, 2025, with an English translation.

* cited by examiner

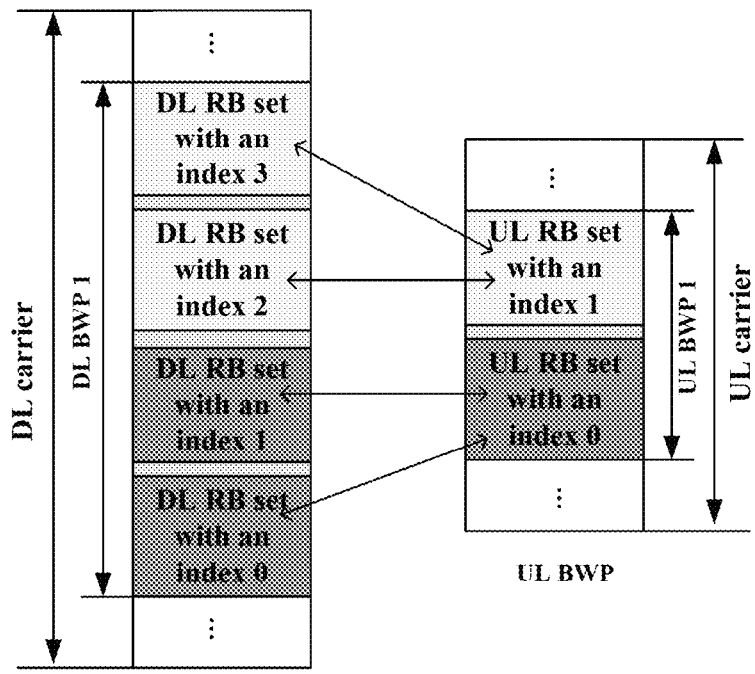

FIG. 12

1301 a terminal equipment receives indication information used for scheduling the terminal equipment to transmit uplink transmission

1302 a frequency-domain resource allocation (FRDA) bit number is determined according to a subcarrier spacing (SCS) of an active uplink bandwidth part when the indication information is received and/or the number of resource block sets included in the active uplink bandwidth part, or, an FRDA bit number is determined according to a carrier where the uplink transmission is located or the subcarrier spacing (SCS) of the active uplink bandwidth part and/or the number of resource block sets included in the carrier where the uplink transmission is located, or, an FRDA bit number is determined according to a subcarrier spacing (SCS) of a specific active uplink bandwidth part in at least one configured uplink bandwidth part and/or the number of resource block sets included in the active uplink bandwidth part

FIG. 13

UPLINK TRANSMISSION METHOD AND APPARATUS

CROSS-REFERENCE TO RELATED APPLICATION

This application is a continuation application of International Application PCT/CN2020/090709 filed on May 15, 2020, and designated the U.S., which is based upon and claims the benefit of priority of the prior International Application PCT/CN2020/075390, filed on Feb. 14, 2020. The entire contents of these applications are incorporated herein by reference.

TECHNICAL FIELD

This disclosure relates to the field of communication technologies.

BACKGROUND

An unlicensed spectrum, or referred to as a shared spectrum, is an important component of spectrum resources, and there are already many systems supporting data transmission on unlicensed spectra, such as WiFi, long term evolution (LTE) license assisted access (LAA). However, New Radio (NR) systems do not support an unlicensed spectrum at present.

With the introduction of a bandwidth part (BWP), one or more BWPs may be preconfigured for a terminal equipment. Different subcarrier spacings (SCSs) may be configured for different BWPs, for example, an SCS may be 15 kHz, or 30 kHz. The terminal equipment may operate by using an active BWP, and may switch a BWP according to signaling, such as a radio resource control (RRC) message, and downlink control information (DCI), or according to a timer state.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

However, it was found by the inventors that in a case where uplink transmission is scheduled on an uplink BWP including at least two resource block sets (RB sets), or in a case where a terminal equipment is indicated that a spectrum resource has no guard band, or in a case where a terminal equipment is instructed to perform BWP switch, the terminal equipment may be possibly unable to determine a resource for the uplink transmission, which may cause the uplink transmission to be unable to be transmitted and received correctly.

Addressed to at least one of the above problems, embodiments of this disclosure provide an uplink transmission method and apparatus, which may support a terminal equipment to determine a resource for uplink transmission, so that the uplink transmission is unable to be transmitted and received correctly.

According to an aspect of the embodiments of this disclosure, there is provided an uplink transmission method, including:
receiving, by a terminal equipment, indication information not including an indication field used for indicating RB set, the indication information scheduling uplink transmission on an uplink bandwidth part including at least two resource block sets; and
transmitting the uplink transmission on at least one predefined or preconfigured resource block set.

According to another aspect of the embodiments of this disclosure, there is provided an uplink transmission apparatus, including:
a receiving unit configured to receive indication information not including an indication field used for indicating RB set, the indication information scheduling uplink transmission on an uplink bandwidth part including at least two resource block sets; and
a transmitting unit configured to transmit the uplink transmission on at least one predefined or preconfigured resource block set.

According to a further aspect of the embodiments of this disclosure, there is provided an uplink transmission method, including:
receiving, by a terminal equipment, indication information used for scheduling the terminal equipment to transmit uplink transmission; and
determining a frequency-domain resource allocation bit number according to a subcarrier spacing of an active uplink bandwidth part when the indication information is received and/or the number of resource block sets included in the active uplink bandwidth part, or, determining a frequency-domain resource allocation bit number according to a carrier where the uplink transmission is located or the subcarrier spacing of the active uplink bandwidth part and/or the number of resource block sets included in the carrier where the uplink transmission is located, or, determining a frequency-domain resource allocation bit number according to a subcarrier spacing of a specific active uplink bandwidth part in at least one configured uplink bandwidth part and/or the number of resource block sets included in the active uplink bandwidth part.

According to still another aspect of the embodiments of this disclosure, there is provided an uplink transmission apparatus, including:
a receiving unit configured to receive indication information used for scheduling a terminal equipment to transmit uplink transmission; and
a processing unit configured to determine a frequency-domain resource allocation bit number according to a subcarrier spacing of an active uplink bandwidth part when the indication information is received and/or the number of resource block sets included in the active uplink bandwidth part, or, determine a frequency-domain resource allocation bit number according to a carrier where the uplink transmission is located or the subcarrier spacing of the active uplink bandwidth part and/or the number of resource block sets included in the carrier where the uplink transmission is located, or, determine a frequency-domain resource allocation bit number according to a subcarrier spacing of a specific active uplink bandwidth part in at least one configured uplink bandwidth part and/or the number of resource block sets included in the active uplink bandwidth part.

According to still another aspect of the embodiments of this disclosure, there is provided an uplink transmission method, including:
receiving, by a terminal equipment, first configuration information for indicating a guard band and/or a resource block set of an uplink carrier; and
determining resource blocks included in the resource block set on the uplink carrier by the terminal equipment according to a frequency-domain position of a starting resource block and/or a frequency-domain position of an ending resource block of the guard band.

According to still another aspect of the embodiments of this disclosure, there is provided an uplink transmission apparatus, including:

a receiving unit configured to receive first configuration information for indicating a guard band and/or a resource block set of an uplink carrier; and a processing unit configured to determine resource blocks included in the resource block set on the uplink carrier according to a frequency-domain position of a starting resource block and/or a frequency-domain position of an ending resource block of the guard band.

According to still another aspect of the embodiments of this disclosure, there is provided an uplink transmission method, including:

receiving indication information used for scheduling uplink transmission, the indication information including an indication field used for indicating resource block sets (RB sets), and the indication information indicating at least two resource block sets (RB sets); and determining resource blocks used for transmitting the uplink transmission according to the indication information, and transmitting the uplink transmission on the determined resource blocks.

According to still another aspect of the embodiments of this disclosure, there is provided an uplink transmission apparatus, including:

a receiving unit configured to receive indication information used for scheduling uplink transmission, the indication information including an indication field used for indicating resource block sets (RB sets), and the indication information indicating at least two resource block sets (RB sets); and a transmitting unit configured to determine resource blocks used for transmitting the uplink transmission according to the indication information, the transmitting unit being further configured to transmit the uplink transmission on the determined resource blocks.

According to still another aspect of the embodiments of this disclosure, there is provided an uplink transmission method, including:

receiving indication information indicating a resource used by a terminal equipment in transmitting uplink transmission; and in a case where a downlink carrier is configured as having no guard band, taking a predetermined number of resource blocks in a downlink bandwidth part (DL BWP) as a predefined or preconfigured resource block set, and transmitting the uplink transmission on the predefined or preconfigured resource block set.

According to still another aspect of the embodiments of this disclosure, there is provided an uplink transmission apparatus, including:

a receiving unit configured to receive indication information indicating a resource used by a terminal equipment in transmitting uplink transmission; and a transmitting unit configured to, in a case where a downlink carrier is configured as having no guard band, take a predetermined number of resource blocks in a downlink bandwidth part (DL BWP) as a predefined or preconfigured resource block set, and transmit the uplink transmission on the predefined or preconfigured resource block set.

According to still another aspect of the embodiments of this disclosure, there is provided an uplink transmission method, including:

transmitting indication information used for scheduling uplink transmission, the indication information including an indication field used for indicating resource block sets (RB sets), and the indication information indicating at least two resource block sets (RB sets); and determining a resource block for receiving the uplink transmission according to the indication information, and receiving the uplink transmission on the determined resource block.

According to still another aspect of the embodiments of this disclosure, there is provided an uplink transmission apparatus, including:

a first transmitting unit configured to transmit indication information used for scheduling uplink transmission, the indication information including an indication field used for indicating resource block sets (RB sets), and the indication information indicating at least two resource block sets (RB sets); and a first receiving unit configured to receive the uplink transmission according to whether a terminal equipment indicates that the terminal equipment is able to transmit uplink transmission on an intra-cell guard band.

An advantage of the embodiments of this disclosure exists in that the terminal equipment is supported to determine a resource for uplink transmission, so that the uplink transmission is unable to be transmitted and received correctly.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

FIG. 12 is a further exemplary diagram of the relationship between downlink RB sets of a downlink BWP and uplink RB sets of an uplink BWP of an embodiment of this disclosure;

FIG. 13 is a further schematic diagram of the uplink transmission method of the embodiment of this disclosure;

DETAILED DESCRIPTION OF THE DISCLOSURE

Figure 1:
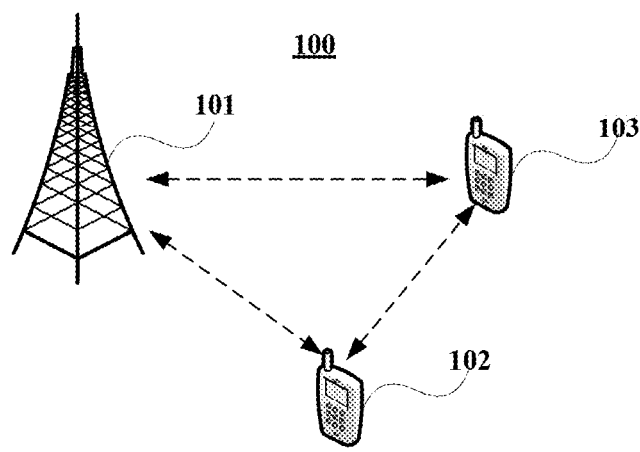
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (genescalen), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

Wherein, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiments of this disclosure, existing services or services that may be implemented in the future may be performed between the network device 101 and the terminal equipments 102, 103. For example, such services may include but not limited to an enhanced mobile broadband (eMBB), massive machine type communication (MTC), and ultra-reliable and low-latency communication (URLLC).

Figure 2:
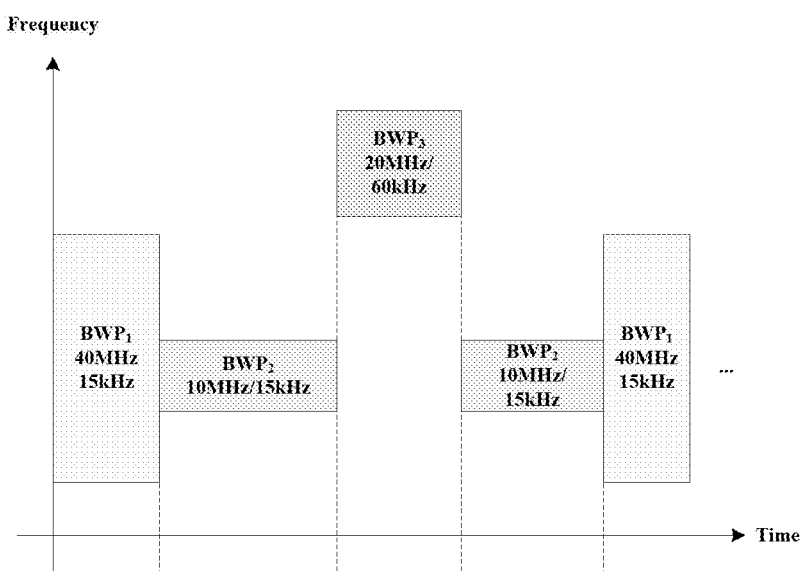
FIG. 2 is an exemplary diagram of BWP switch.

FIG. 2 is an exemplary diagram of BWP switch. As shown in FIG. 2, a terminal equipment may switch between BWP1, BWP2 and BWP3.

For an unlicensed spectrum (or a shared spectrum), RRC signaling is added to configure frequency-domain resources.

On the one hand, taking coexistence between systems into account, in some cases, an intra-cell guard band (hereinafter referred to as a guard band) needs to be introduced. That is, within a carrier bandwidth, some resource blocks cannot be used for transmitting downlink transmission or uplink transmission.

Figure 3:
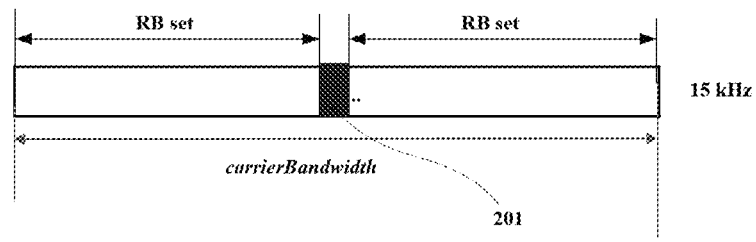
FIG. 3 is an exemplary diagram of guard bands and resource block sets.

FIG. 3 is an exemplary diagram of guard bands and resource block sets. As shown in FIG. 3, for example, for a carrier bandwidth with an SCS of 15 kHz, there exists a guard band 201 between two resource block sets. Furthermore, in configuring BWPs for the terminal equipment, a BWP should not partially overlap with a resource block set. That is, one BWP should include an integer number of resource block sets.

Figure 4:
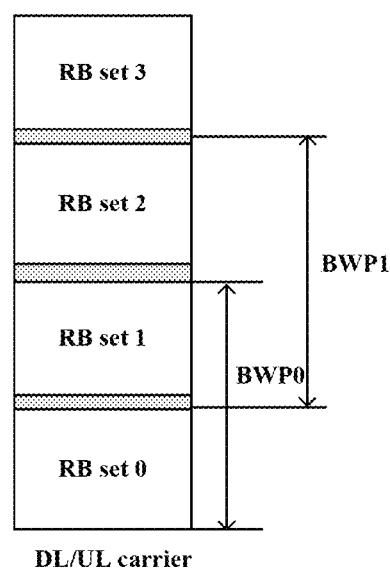
FIG. 4 is an exemplary diagram of relationship between carriers, guard bands and resource block sets.

FIG. 4 is an exemplary diagram of relationship between carriers, guard bands and resource block sets, which is applicable to both downlink and uplink. As shown in FIG. 4, both BWP0 and BWP1 include an integer number (e.g. two) of RB sets.

The network device may indicate intra-cell guard bands and/or resource block sets via higher-layer signaling. For example, intraCell GuardBandUL-r16 and intraCellGuardBandDL-r16 are used to respectively configure uplink and downlink intra-cell guard bands and/or resource block sets (RB sets); these two parameters may also respectively indicate that there exists no intra-cell guard band for uplink and downlink. If the terminal equipment is not provided with these two parameters, the terminal equipment may determine intra-cell guard bands and/or resource block sets according to the RAN4 protocol.

On the other hand, in some cases, the uplink transmission needs to use interlaced resource blocks (that is, using uplink frequency resource allocation Type 2). For example, a correspondence between subcarrier spacings and the number of interlaces is shown in Table 1 below. That is, if a subcarrier spacing is 15 kHz ($\mu=0$), it is divided into 10 RB interlaces (M=10); and if a subcarrier spacing is 30 kHz ($\mu=1$), it is divided into 5 RB interlaces (M=5).

TABLE 1

| $\mu$ | M |
|---|---|
| 0 | 10 |
| 1 | 5 |

Figure 5:
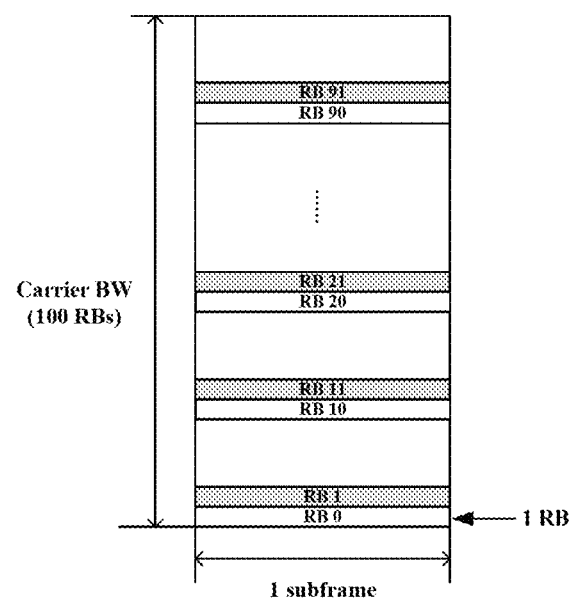
FIG. 5 is an exemplary diagram of interlace frequency-domain resources.

FIG. 5 is an exemplary diagram of interlace frequency-domain resources. Assuming that an uplink carrier includes 100 RBs with a subcarrier spacing of 15 kHz, as shown in FIG. 5, the RBs may be divided into multiple groups (referred to as RB interlaces), group 0 (RB interlace 0) including, for example, RB0, RB10, RB90, and group 1 (RB interlace 1) including RB1, RB11, RB91, . . . . According to scheduling of the network device, the terminal equipment may transmit uplink transmission by using an integer number of groups (RB interlaces), such as transmitting the uplink transmission by using RB0, RB10, RB90 (i.e. RB interlace 0).

The network device may instruct the terminal equipment via higher-layer signaling to transmit the uplink transmission by using interlaced resource blocks (that is, using uplink frequency resource allocation Type 2). The higher-layer signaling is, for example, useInterlacePUSCH-Common-r16, useInterlacePUSCH-Dedicated-r16, useInterlace PUCCH-Common-r16, useInterlacePUCCH-Dedicated, useInterlacePUCCH-PUSCH, and useInterlacePUCCH-PUSCH-r16.

Figure 6:
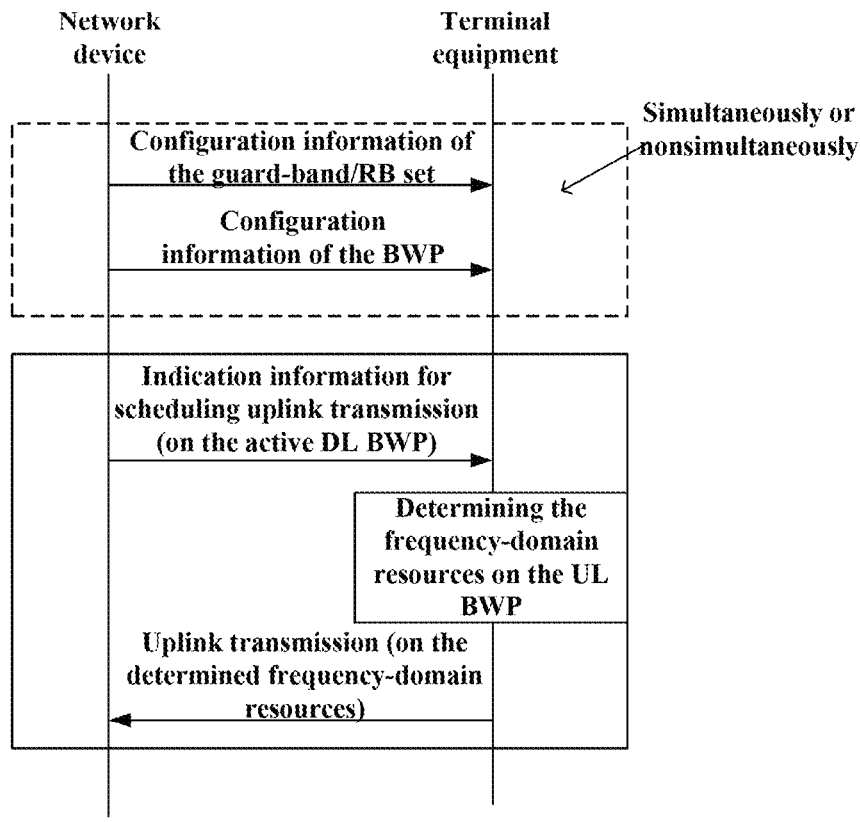
FIG. 6 is a schematic diagram of interaction between a network device and a terminal equipment.

FIG. 6 is a schematic diagram of interaction between the network device and the terminal equipment. As shown in FIG. 6, the network device may transmit configuration information of guard bands and/or RB sets to the terminal equipment, and may further transmit configuration information of BWPs to the terminal equipment. The two kinds of configuration information may be transmitted simultaneously (such as included in the same RRC message), or may be transmitted separately (nonsimultaneously).

As shown in FIG. 6, the network device may transmit indication information for scheduling uplink transmission to the terminal equipment on an active DL BWP. After determining a frequency-domain resource on the UL BWP, the terminal equipment transmits the uplink transmission on the determined frequency-domain resource.

FIG. 6 schematically illustrates interaction between the network device and the terminal equipment according to the embodiment of this disclosure. However, this disclosure is not limited thereto, for example, one or more operations therein may be omitted, or one or more other operations may be added.

In the following description, without causing confusion, the terms "uplink control signal" and "uplink control information (UCI)" or "physical uplink control channel (PUCCH)" are interchangeable, and the terms "uplink data signal" and "uplink data information" or "physical uplink shared channel (PUSCH)" are interchangeable.

The terms "downlink control signal" and "downlink control information (DCI)" or "physical downlink control channel (PDCCH)" are interchangeable, and the terms "downlink data signal" and "downlink data information" or "physical downlink shared channel (PDSCH)" are interchangeable.

In addition, transmitting or receiving a PUSCH may be understood as transmitting or receiving uplink data carried by the PUSCH, transmitting or receiving a PUCCH may be understood as transmitting or receiving uplink information carried by the PUCCH, and transmitting or receiving a PRACH may be understood as transmitting or receiving a preamble carried by the PRACH; and an uplink signal may include an uplink data signal and/or an uplink control signal, etc., and may also be referred to as an uplink transmission (UL transmission) or uplink information or an uplink channel. Transmitting uplink transmission on an uplink resource may be understood as transmitting the uplink transmission by using the uplink resource. Likewise, downlink data/signals/channels/information may be understood accordingly.

In the embodiments of this disclosure, higher-layer signaling may be, for example, radio resource control (RRC) signaling, such as being referred to as an RRC message, such as including an MIB, system information, and dedicated RRC message, or being referred to as an RRC IE (RRC information element). The higher-layer signaling may also be, for example, MAC (medium access control) signaling, or may be referred to as an MAC IE (MAC information element). However, this disclosure is not limited thereto.

Embodiment of a First Aspect

In a case where uplink transmission is scheduled on an uplink BWP including at least two resource block sets (RB sets), a terminal equipment may not be able to determine a resource for uplink transmission, thereby resulting in the uplink transmission not being transmitted and received correctly.

For example, DCI format 0_0 does not include an indication field for indicating an RB set, but DCI format 0_0 is used to schedule uplink transmission on a UL BWP including at least two RB sets. In this case, the terminal equipment is not currently supported to determine an RB set used for transmitting the uplink transmission. That is, if the terminal equipment receives DCI format 0_0 and an active UL BWP includes at least two RB sets, the terminal equipment is unable to uniquely determine a resources used for uplink transmission, which may result in the uplink transmission not being transmitted and received correctly.

At least addressed to this problem, the embodiment of this disclosure provides an uplink transmission method, which shall described from a terminal equipment side, and reference may be made to FIG. 6 for a process of interaction between the terminal equipment and the network device.

Figure 7:
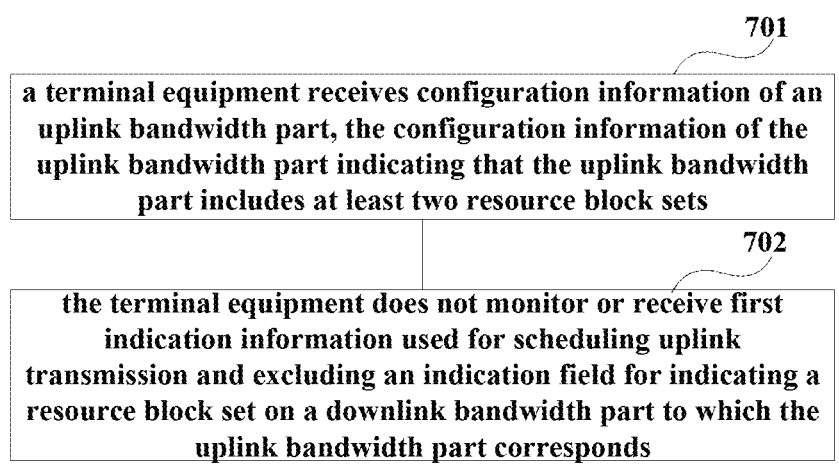
FIG. 7 is a schematic diagram of the uplink transmission method of an embodiment of this disclosure.

FIG. 7 is a schematic diagram of the uplink transmission method of the embodiment of this disclosure. As shown in FIG. 7, the method includes:

701: a terminal equipment receives configuration information of an uplink bandwidth part (UL BWP), the configuration information of the uplink bandwidth part (UL BWP) indicating that the uplink bandwidth part includes at least two resource block sets (RB sets); and

702: the terminal equipment does not monitor or receive first indication information used for scheduling uplink transmission and not including an indication field used for indicating RB set on a downlink bandwidth part (DL BWP) to which the uplink bandwidth part corresponds.

It should be noted that FIG. 7 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

In some embodiments, the configuration information of the uplink bandwidth part (UL BWP) may be BWP-Uplink, and may be shown, for example, in Table 2 below:

TABLE 2

| BWP-Uplink ::= | SEQUENCE { |
|---|---|
| bwp-Id | BWP-Id, |
| bwp-Common | BWP-UplinkCommon |
| OPTIONAL, -- Cond SetupOtherBWP | BWP-UplinkDedicated |
| bwp-Dedicated | |

TABLE 2-continued

```
    OPTIONAL, -- Cond SetupOtherBWP
    ...
  }
```

More specifically, genericParameters included in BWP-UplinkCommon includes an information element (IE) for indicating an SCS and a frequency domain position and a bandwidth of the UL BWP, as shown in Table 3 below. The terminal equipment may determine the number of RB sets (and frequency-domain positions) included in the UL BWP according to the IE.

TABLE 3

```
BWP-UplinkCommon ::=          SEQUENCE {
  genericParameters             BWP,
  rach-ConfigCommon             SetupRelease {
  RACH-ConfigCommon }             OPTIONAL,
  -- Need M
  pusch-ConfigCommon            SetupRelease {
  PUSCH-ConfigCommon }            OPTIONAL,
  -- Need M
  pucch-ConfigCommon            SetupRelease {
  PUCCH-ConfigCommon }            OPTIONAL,
  -- Need M
  ...
}
BWP ::=                       SEQUENCE {
  locationAndBandwidth          INTEGER (0..37949),
  subcarrierSpacing             SubcarrierSpacing,
  cyclicPrefix                  ENUMERATED { extended }
  OPTIONAL  -- Need R
}
```

In some embodiments, one of the at least one configured DL BWP is linked/associated/paired with/corresponds to one UL BWP of the at least one configured UL BWP. Generally, one DL BWP is linked with/corresponds to only one UL BWP. And one UL BWP may be linked with/correspond to one or more than one DL BWPs.

The linking/corresponding between the DL BWP and the UL BWP here refers to, for example, that when the terminal equipment receives the indication information for scheduling the uplink transmission on a DL BWP, if the indication information does not include an indication field for indicating a BWP, or the indication information includes an indication field for indicating a BWP but the terminal equipment ignores the indication field, the terminal equipment transmits the uplink transmission at the UL BWP linked with/corresponding to the DL BWP.

The linking/corresponding relationship may be pre-defined, for example, the uplink bandwidth part and the corresponding downlink bandwidth part have identical identifiers (bwp-Id) or indices. For downlink and uplink respectively, the indices are provided by bwp-Id in BWP-Downlink/BWP-Uplink, which may uniquely identify a BWP. That is, a UL BWP of an index n (n is a natural number) is linked/corresponds to a DL BWP of an index n (n is a natural number). At this moment, one UL BWP has at most one linked/corresponding DL BWP, and vice versa.

Alternatively, the linking/corresponding relationship may be configured by higher-layer signaling. For example, an IE is added to the BWP-Uplink to indicate the DL BWP with/to which the UL BWP is linked/corresponds, for example, as shown in Table 4 or Table 5. Or, an IE is added to the BWP-Downlink to indicate the UL BWP with/to which the DL BWP is linked/corresponds, for example, as shown in Table 6.

TABLE 4

```
BWP-Uplink ::=                SEQUENCE {
  bwp-Id                        BWP-Id,
  bwp-Common                    BWP-UplinkCommon
  OPTIONAL, -- Cond SetupOtherBWP
  bwp-Dedicated                 BWP-UplinkDedicated
  OPTIONAL, -- Cond SetupOtherBWP
  linkedBWP                     BWP-Id,
  ...
}
```

TABLE 5

```
BWP-Uplink ::=                SEQUENCE {
  bwp-Id                        BWP-Id,
  bwp-Common                    BWP-Uplinkcommon
  OPTIONAL, -- Cond SetupOtherBWP
  bwp-Dedicated                 BWP-UplinkDedicated
  OPTIONAL, -- Cond SetupOtherBWP
  linkedBWP                     SEQUENCE (SIZE
  (1..maxNrofBWPs)) OF BWP-Id,
  ...
}
```

TABLE 6

```
BWP-Downlink ::=              SEQUENCE {
  bwp-Id                        BWP-Id,
  bwp-Common                    BWP-DownlinkCommon
  OPTIONAL, -- Cond SetupOtherBWP
  bwp-Dedicated                 BWP-DownlinkDedicated
  OPTIONAL, -- Cond SetupOtherBWP
  linkedBWP                     BWP-Id,
  ...
}
```

In some embodiments, the first indication information includes: downlink control information having a downlink control information format 0_0, or downlink control information having a downlink control information format 0_2 (excluding an indication field for indicating a resource block set), or a random access response (RAR) in a random access procedure.

In some embodiments, the terminal equipment does not expect to be configured with or determine not to configure to monitor or receive the first indication information on the downlink bandwidth part to which the uplink bandwidth part corresponds. That is, the terminal equipment expects to configure or determine to configure to monitor or receive indication information for scheduling uplink transmission including an indication field for indicating a resource block set on the DL BWP to which the UL BWP corresponds, such as downlink control information having downlink control information format 0_1, or downlink control information having downlink control information format 0_2 (including the indication field for indicating a resource block set).

For example, if a UL BWP includes two or more RB sets, the terminal equipment is not configured on the DL BWP with/to which the UL BWP is linked/corresponds to monitor the downlink control information having DCI format 0_0, and/or the downlink control information having DCI format 0_2. Therefore, configuration of the network device may be restricted to prevent a UE from monitoring or receiving the indication information for scheduling uplink transmission excluding the indication field for indicating a resource block set when an active UL BWP is a UL BWP including at least two RB sets, thereby avoiding occurrence of the above problem and saving power consumption of the terminal equipment (power saving).

In some embodiments, on the downlink bandwidth part to which the uplink bandwidth part corresponds, the terminal equipment does not monitor or receive second indication information for scheduling downlink transmission. The second indication information includes: downlink control information having a downlink control information format 1_0.

For example, if a UL BWP includes two or more RB sets, the terminal equipment is not configured on the DL BWP to which the UL BWP corresponds to monitor DCI format 0_0 and DCI format 1_0. Therefore, configuration of the network device may be restricted to prevent a UE from monitoring or receiving the indication information for scheduling uplink transmission excluding the indication field for indicating a resource block set when an active UL BWP is a UL BWP including at least two RB sets, thereby avoiding occurrence of the above problem and saving power consumption of the terminal equipment (power saving).

In some embodiments, the terminal equipment does not transmit a physical random access channel (PRACH) of contention-based random access (CBRA) on the uplink bandwidth part; or the terminal equipment does not transmit a physical random access channel (PRACH) other than those for beam failure recovery (BFR) based on CFRA on the uplink bandwidth part; or, the terminal equipment does not transmit a physical random access channel (PRACH) on the uplink bandwidth part.

For example, in a contention-based random access (CBRA) procedure, the indication information for scheduling uplink transmission includes a random access response (RAR) and a DCI for scheduling msg.3 retransmission (TC-RNTI scrambled DCI format 0_0).

If the indication information does not include an indication field for indicating an RB set, in a case where scheduling uplink transmission on a UL BWP including at least two RB sets by using the indication information is not supported, or in other words, in a case where the terminal equipment does not support to determine a frequency-domain resource for transmitting the uplink transmission a UL BWP including at least two RB sets according to the indication information, if a UL BWP includes two or more RB sets, the UE is unable to perform CBRA on the UL BWP. That is, if a UL BWP includes at least two RB sets, the terminal equipment does not perform CBRA on the UL BWP (including not transmitting a PRACH for the CBRA).

In some embodiments, the configuration information of the uplink bandwidth part (UL BWP) does not include information indicating physical random access channel configuration of the contention-based random access. Specifically, in order to avoid unnecessary signaling overhead, if a UL BWP includes two or more RB sets, a PRACH for the CBRA is not configured on the UL BWP. That is, if a UL BWP includes two or more RB sets, the configuration information of the uplink bandwidth part (UL BWP) does not include information indicating the physical random access channel configuration for the CBRA. For example, rach-ConfigCommon is not included in BWP-UplinkCommon, as shown in Table 7 below.

TABLE 7

| BWP-UplinkCommon ::= | SEQUENCE { |
|---|---|
| genericParameters | BWP, |
| rach-ConfigCommon RACH-ConfigCommon } OPTIONAL, -- Need M | SetupRelease { |
| pusch-ConfigCommon PUSCH-ConfigCommon } | SetupRelease { OPTIONAL, |

TABLE 7-continued

| -- Need M | |
|---|---|
| pucch-ConfigCommon PUCCH-ConfigCommon } | SetupRelease { OPTIONAL, |
| -- Need M | |
| ... | |
| } | |

For another example, except for contention-free-free random access (CFRA) for BFR, a PDSCH to which the RAR corresponds needs to be indicated by (RA-RNTI scrambled) DCI format 1_0.

If monitoring or receiving downlink control information having DCI format 0_0 and monitoring or receiving downlink control information having DCI format 1_0 are configured in a binding manner, if it is not configured that the terminal equipment monitors or receives the downlink control information having DCI format 0_0 on a DL BWP, it is not configured that the terminal equipment monitors or receives the downlink control information having DCI format 1_0 on a DL BWP.

Therefore, if a UL BWP includes two or more RB sets, in the case where scheduling uplink transmission on a UL BWP including at least two RB sets by using the downlink control information having DCI format 0_0 is not supported, or in other words, if the terminal equipment does not support determining a frequency-domain resource for transmitting the uplink transmission on a UL BWP including at least two RB sets according to the downlink control information having DCI format 0_0, in order to avoid unnecessary signaling overhead, the terminal equipment should not be configured to monitor/receive DCI format 1_0 at the DL BWP with/to which the UL BWP is linked/corresponds. In this way, the terminal equipment is unable to perform contention-free random access other than that for BFR at the UL BWP. That is, if a UL BWP includes at least two RB sets, the terminal equipment does not perform contention-free random access other than that for BFR (including not transmitting a PRACH of contention-free random access other than that for BFR) at the UL BWP.

In some embodiments, the configuration information of the uplink bandwidth part (UL BWP) does not include information indicating physical random access channel configuration other than that for beam failure recovery. Specifically, in order to avoid unnecessary signaling overhead, if a UL BWP includes two or more RB sets, the UL BWP should also not be configured with a PRACH of CFRA other than that for BFR. That is, if a UL BWP includes at least two RB sets, the configuration information of the uplink bandwidth part (UL BWP) does not include information on PRACH configuration of CFRA other than that for BFR.

For another example, taking problems possibly existing in the above CBRA and CFRA into account, in order to simplify design and lower complexity, if a UL BWP includes at least two RB sets, the terminal equipment does not perform random access (including not transmitting a PRACH) at the UL BWP. In some embodiments, in order to avoid unnecessary signaling overhead, the uplink bandwidth part (UL BWP) configuration information does not include information for indicating physical random access channel configuration.

For example, rach-ConfigCommon is not included in BWP-UplinkCommon, and beamFailureRecoveryConfig is not included in BWP-Uplink Dedicated, as shown in Table 8 below.

TABLE 8

| | |
|---|---|
| BWP-UplinkCommon ::= | SEQUENCE { |
| genericParameters | BWP, |
| ~~rach-ConfigCommon~~ | ~~SetupRelease {~~ |
| ~~RACH-ConfigCommon }~~ | ~~OPTIONAL,~~ |
| ~~-- Need M~~ | |
| pusch-ConfigCommon | SetupRelease { |
| PUSCH-ConfigCommon } | OPTIONAL, |
| -- Need M | |
| pucch-ConfigCommon | SetupRelease { |
| PUCCH-ConfigCommon } | OPTIONAL, |
| -- Need M | |
| ... | |
| } | |
| BWP-UplinkDedicated ::= | SEQUENCE { |
| pucch-Config | SetupRelease { PUCCH-Config } |
| OPTIONAL, -- Need M | |
| pusch-Config | SetupRelease { PUSCH-Config } |
| OPTIONAL, -- Need M | |
| configuredGrantConfig | SetupRelease { |
| ConfiguredGrantConfig } | OPTIONAL, -- Need |
| M | |
| srs-Config | SetupRelease { SRS-Config } |
| OPTIONAL, -- Need M | |
| ~~beamFailureRecoveryConfig~~ | ~~SetupRelease {~~ |
| ~~BeamFailureRecoveryConfig }~~ | ~~OPTIONAL, -- Cond~~ |
| ~~SpCellOnly~~ | |
| ... | |
| } | |

In some embodiments, the terminal equipment receives configuration information of the DL BWP, and the configuration information of the DL BWP does not include configuration information instructing the terminal equipment to monitor or receive the first indication information, and/or, does not include configuration information instructing the terminal equipment to monitor or receive second indication information.

That is, in order to support the network device to schedule the terminal equipment to transmit uplink transmission on a UL BWP including at least two RB sets, the configuration information of the DL BWP with/to which the UL BWP is linked/corresponds should instruct the terminal equipment to monitor or receive the indication information including the indication field for indicating an RB set, such as the downlink control information having DCI format 0_1.

For example, the configuration information of the DL BWP is BWP-Downlink, as shown in Table 9 below.

TABLE 9

| | |
|---|---|
| BWP-Downlink ::= | SEQUENCE { |
| bwp-Id | BWP-Id, |
| bwp-Common | BWP-DownlinkCommon |
| OPTIONAL, -- Cond SetupOtherBWP | |
| bwp-Dedicated | BWP-DownlinkDedicated |
| OPTIONAL, -- Cond SetupOtherBWP | |
| ... | |
| } | |

For another example, BWP-DownlinkCommon does not include pdcch-ConfigCommon, as shown in Table 10 below.

TABLE 10

| | |
|---|---|
| BWP-DownlinkCommon ::= | SEQUENCE { |
| genericParameters | BWP, |
| ~~pdcch-ConfigCommon~~ | ~~SetupRelease {~~ |
| ~~PDCCH-ConfigCommon }~~ | ~~OPTIONAL,~~ |
| ~~-- Need M~~ | |
| pdsch-ConfigCommon | SetupRelease { |
| PDSCH-ConfigCommon } | OPTIONAL, |
| -- Need M | |
| ... | |
| } | |

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the terminal equipment may be supported to determine the resource used for uplink transmission, so that the uplink transmission may be transmitted and received correctly.

Embodiment of a Second Aspect

The embodiment of this disclosure provides an uplink transmission method, which shall be described from a terminal equipment side, and reference may be made to FIG. 6 for an interaction process between a terminal equipment and a network device. The embodiment of this disclosure may be implemented in combination with the embodiment of the first aspect, or may be implemented separately, with contents identical to those in the embodiment of the first aspect being not going to be described herein any further.

Referring to FIG. 6, for example, the terminal equipment may receive configuration information of the UL BWP (first configuration information) and configuration information of the DL BWP to which the UL BWP corresponds (second configuration information). The first configuration information indicates that the UL BWP includes at least two RB sets, and the second configuration information indicates that the terminal equipment monitors or receives indication information at the DL BWP that is used for scheduling uplink transmission and does not include an indication field for indicating a resource block set. For another example, reference may be made to the embodiment of the first aspect for the linking/corresponding relationship between the UL BWP and the DL BWP.

Figure 8A:
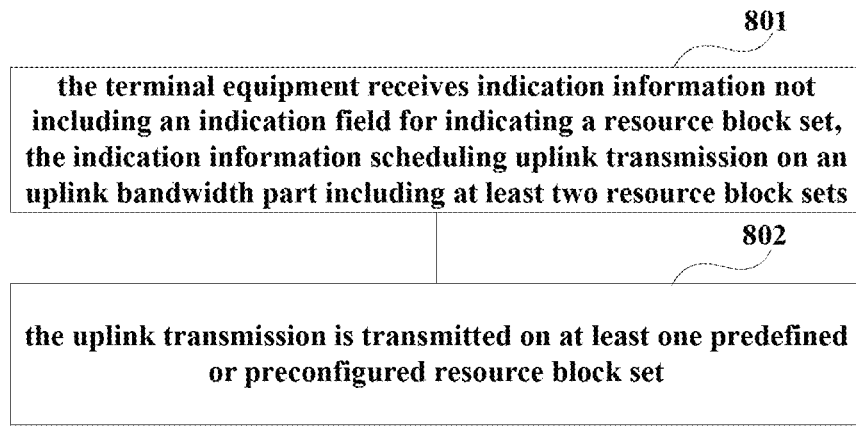
FIG. 8A is another schematic diagram of the uplink transmission method of the embodiment of this disclosure.

FIG. 8A is another schematic diagram of the uplink transmission method of the embodiment of this disclosure. As shown in FIG. 8A, the method includes:

801: the terminal equipment receives indication information not including an indication field used for indicating RB set, the indication information scheduling uplink transmission on an uplink bandwidth part including at least two resource block sets; and

802: the uplink transmission is transmitted on at least one predefined or preconfigured resource block set.

It should be noted that FIG. 8A only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 8A.

In some embodiments, the indication information includes: downlink control information having downlink control information format 0_0, wherein the downlink control information is scrambled by a cell radio network temporary identifier (C-RNTI), or a configured scheduling radio network temporary identifier (CS-RNTI), or a modulation and coding scheme cell radio network temporary identifier (MCS-C-RNTI), or a temporary cell radio network temporary identifier (TC-RNTI).

For example, the at least one resource block set is predefined, and the predefined resource block set includes at least one of the following:

an uplink resource block set, in the at least two resource block sets, linked with a downlink resource block set where a frequency-domain resource for transmitting the indication information is located;
an uplink resource block set, in the at least two resource block sets, corresponding to the frequency-domain resource for transmitting the indication information;
a resource block set, in the at least two resource block sets, having a smallest resource block set index value;
a resource block set, in the at least two resource block sets, having a lowest frequency-domain position;
a resource block set, in the at least two resource block sets, having a highest frequency-domain position;
a resource block set, in the at least two resource block sets, overlapping with an initial uplink bandwidth part;
a resource block set, in the at least two resource block sets, overlapping with some or all of resource block sets included in an initial uplink bandwidth part; and
a part or all of resource block sets in the at least two resource block sets.

The predefined RB sets are only schematically illustrated above; however, this disclosure is not limited thereto. And furthermore, one or any combination of the above resource block sets may be used, and one or more of them may be used preferentially, and specific implementations are not limited in this disclosure.

Example 1: if a frequency range of RBs included in a UL RB set is greater than a frequency range of frequency-domain resources used for transmitting the indication information, the used UL RB set is an uplink resource block set corresponding to the frequency-domain resources used for transmitting the indication information.

Example 2: if there exists an RB set overlapping with the initial UL BWP in the active UL BWP, the overlapped RB set may be used; otherwise, an uplink resource block set in the at least two resource block sets linked with a downlink resource block set where the frequency-domain resources for transmitting the indication information are located is used, or the resource block set having the smallest resource block set index value in the at least two resource block sets is used.

Example 3: the at least one resource block set is indicated by higher-layer signaling, the higher-layer signaling indicating a linking relationship between the uplink resource block set and the downlink resource block set, or the higher-layer signaling configuring the uplink resource block set scheduled by the indication information.

Furthermore, the above method for predefining resource block sets may also be combined with certain conditions.

Example 4: in a case where a downlink carrier (DL carrier) is configured as having no intra-cell guard band (or if the DL carrier is not configured with an intra-cell guard band), if the uplink bandwidth part (that is, the active uplink bandwidth part (active UL BWP)) and a first reference resource have overlapped resource block sets (RB sets), the predefined RB sets may be resource block sets in the uplink bandwidth part overlapping with the first reference resource, wherein if the number of resource block sets overlapping with the first reference resource in the UL BWP is two or more, the predefined resource block sets may include a resource block set having a lowest frequency-domain position or a smallest index value in two or more resource block sets overlapping with the first reference resource in the UL BWP.

In Example 4, the first reference resource is, for example, all or a part of resources used for transmitting the downlink control information (i.e. the downlink control information having downlink control information format 0_0, the downlink control information being scrambled by the C-RNTI or the CS-RNTI or the MCS-C-RNTI or the TC-RNTI), wherein in a case where the first reference resource is a part of resources for transmitting the downlink control information, the first reference resource is, for example, a resource element group (REG) or RB with a lowest frequency-domain position or a smallest index value in the resources for transmitting the downlink control information.

Figure 8B:
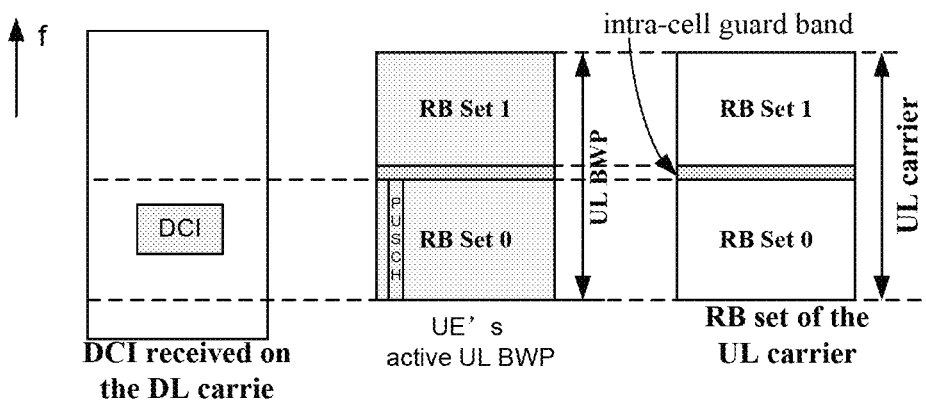
FIG. 8B is a schematic diagram of a DL carrier not configured with an intra-cell guard band.

FIG. 8B is a schematic diagram of a DL carrier not configured with an intra-cell guard band. As shown in FIG. 8B, the DL carrier is not configured with an intra-cell guard band, and a UL carrier is configured with an intra-cell guard band. In FIG. 8B, it is assumed that the active UL BWP of the terminal equipment has an RB set (RB set 0) overlapping with the first reference resource, and the terminal equipment transmits the PUSCH by using RB set 0 in the active UL BWP.

In addition, in FIG. 8B and other drawings, f denotes a frequency, UE's active UL BWP denotes the active uplink bandwidth part of the terminal equipment; a frequency-domain range where the PUSCH is located denotes a range of frequency-domain resources of the terminal equipment for transmitting the PUSCH (i.e. a range of RBs included in the RB set in the active UL BWP, wherein a frequency-domain resource (RB) actually used to transmit the PUSCH is further dependent on interlace indicated by the indication information); in the UE's active UL BWP, the RB sets have corresponding indices, such as RB set 0, and RB set 1, etc.; in the RB sets of the UL carrier, the RB sets have corresponding indices, such as RB set 0, and RB set 1, etc.; and the indices of the RB sets in the RB sets of the UL carrier are mutually independent of the indices of the RB sets in the RB sets of the UE's active UL BWP.

Figure 8C:
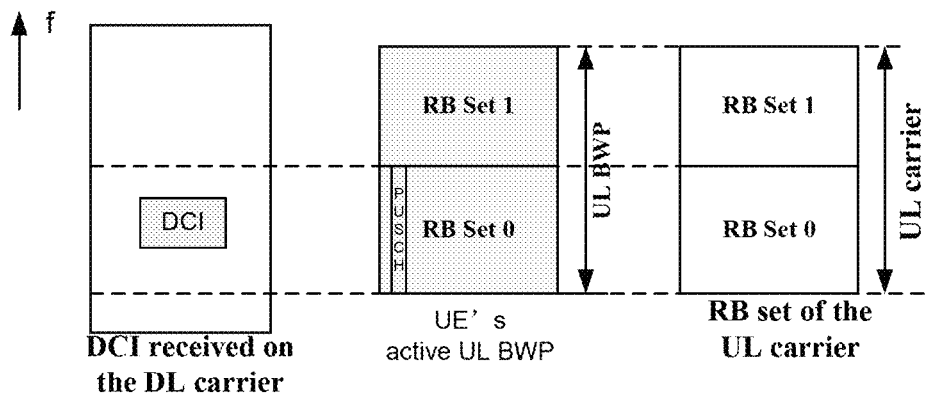
FIG. 8C is another schematic diagram of the DL carrier not configured with an intra-cell guard band.

FIG. 8C is another schematic diagram of the DL carrier not configured with an intra-cell guard band. As shown in FIG. 8C, the DL carrier is not configured with an intra-cell guard band, and the UL carrier is not configured with an intra-cell guard band. In FIG. 8C, it is assumed that the active UL BWP of the terminal equipment has an RB set (RB set 0) overlapping with the first reference resource, and the terminal equipment transmits the PUSCH by using RB set 0 in the active UL BWP. Example 5: in the case where the downlink carrier (DL carrier) is configured as having no intra-cell guard band (or if the DL carrier is not configured with an intra-cell guard band), if the uplink bandwidth part (i.e. the active uplink bandwidth part (active UL BWP)) and the first reference resource do not have an overlapped resource block set (RB set), and the predefined RB set may be a resource block set of the UL BWP with a lowest frequency-domain position or a smallest index value (e.g. RB set 0).

In Example 5, the first reference resource is used to, for example, transmit all or a part of resources of the downlink control information (that is, the downlink control information having downlink control information format 0_0, which is scrambled by the C-RNTI or the CS-RNTI or the MCS-C-RNTI or the TC-RNTI), wherein in a case where the first reference resource is used for transmitting a part of the resources the downlink control information, the first reference resource is, for example, a resource element group (REG) or an RB with a lowest frequency-domain position or a smallest index value in the resources for transmitting the downlink control information.

Figure 8D:
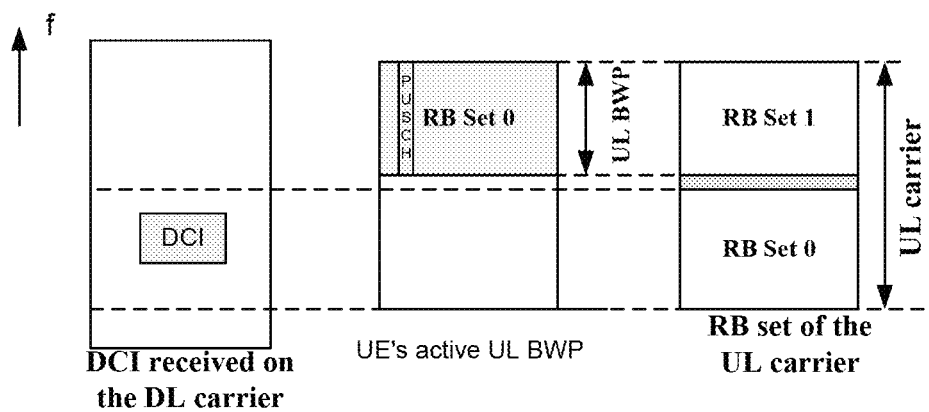
FIG. 8D is a further schematic diagram of the DL carrier not configured with an intra-cell guard band.

FIG. 8D is a further schematic diagram of the DL carrier not configured with an intra-cell guard band. As shown in FIG. 8D, the DL carrier is not configured with an intra-cell guard band, and the UL carrier is configured with an intra-cell guard band. In FIG. 8D, it is assumed that the active UL BWP of the terminal equipment does not have a resource block set (RB set) overlapping with the first reference resource, hence, the PUSCH is transmitted by using RB set 0 of the active UL BWP.

Figure 8E:
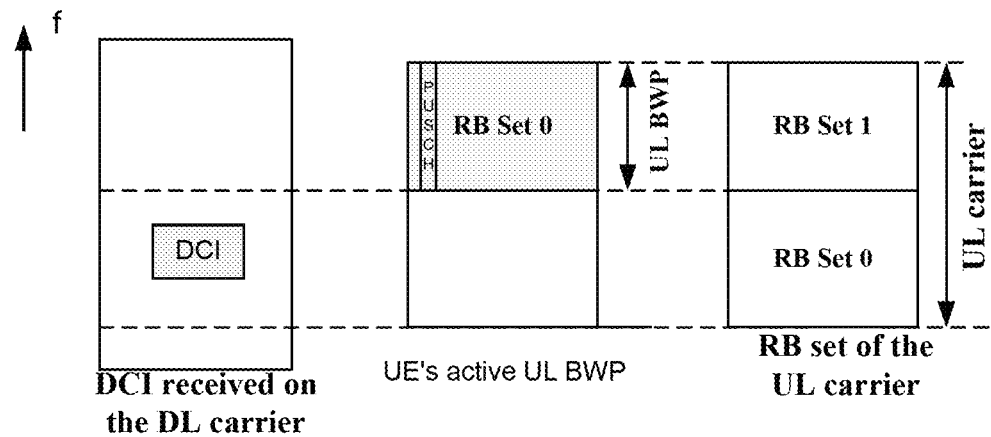
FIG. 8E is still another schematic diagram of the DL carrier not configured with an intra-cell guard band.

FIG. 8E is still another schematic diagram of the DL carrier not configured with an intra-cell guard band. As shown in FIG. 8E, the DL carrier is not configured with an intra-cell guard band, and the UL carrier is also not configured with an intra-cell guard band. In FIG. 8E, it is assumed that the active UL BWP of the terminal equipment does not have a resource block set (RB set) overlapping with the first reference resource, hence, the PUSCH is transmitted by using RB set 0 of the active UL BWP.

Example 6: in the case where the downlink carrier (DL carrier) is configured as having no intra-cell guard band (or the DL carrier is not configured with an intra-cell guard band), the predefined RB set may be a resource block set of the UL BWP with a lowest frequency-domain position or a smallest index value (e.g. RB set 0).

Figure 8F:
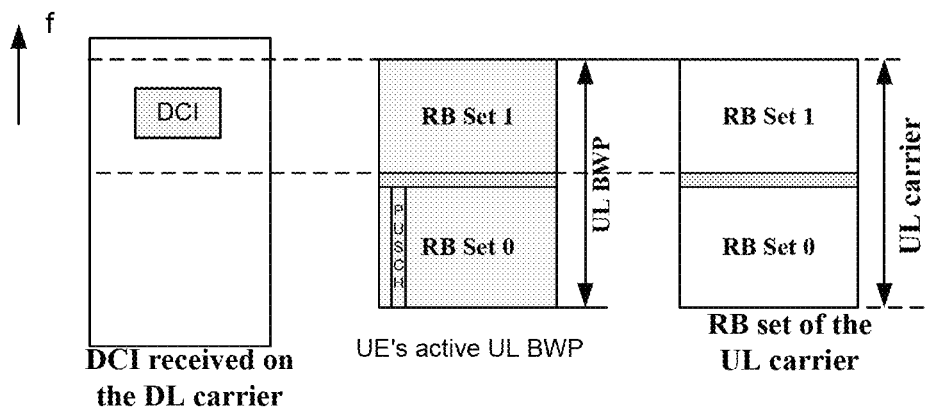
FIG. 8F is still another schematic diagram of the DL carrier not configured with an intra-cell guard band.

FIG. 8F is still another schematic diagram of the DL carrier not configured with an intra-cell guard band. As shown in FIG. 8F, the DL carrier is not configured with an intra-cell guard band, and the UL carrier is configured with an intra-cell guard band. Therefore, RB set 0 of the active UL BWP is used as the predefined RB set to transmit the PUSCH.

Figure 8G:
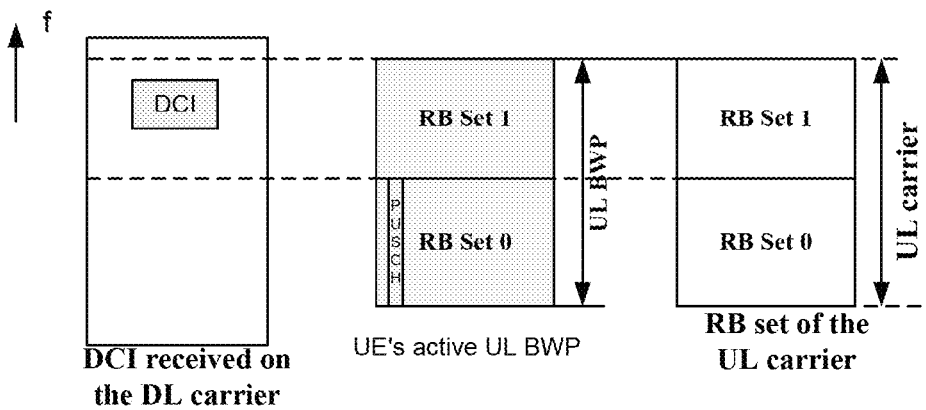
FIG. 8G is still another schematic diagram of the DL carrier not configured with an intra-cell guard band.

FIG. 8G is still another schematic diagram of the DL carrier not configured with an intra-cell guard band. As shown in FIG. 8G, the DL carrier is not configured with an intra-cell guard band, and the UL carrier is also not configured with an intra-cell guard band. Therefore, RB set 0 of the active UL BWP is used as the predefined RB set to transmit the PUSCH.

Figure 8H:
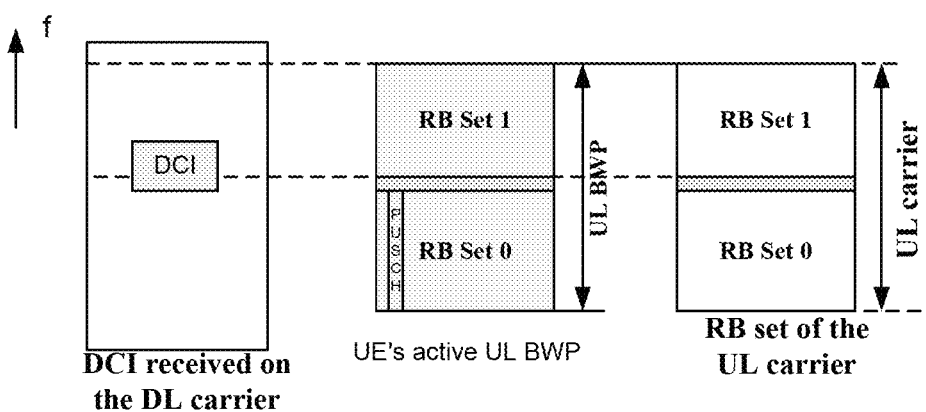
FIG. 8H is still another schematic diagram of the DL carrier not configured with an intra-cell guard band.

FIG. 8H is still another schematic diagram of the DL carrier not configured with an intra-cell guard band. As shown in FIG. 8H, the DL carrier is not configured with an intra-cell guard band, and the UL carrier is configured with an intra-cell guard band. Therefore, RB set 0 of the active UL BWP is used as the predefined RB set to transmit the PUSCH.

Figure 8I:
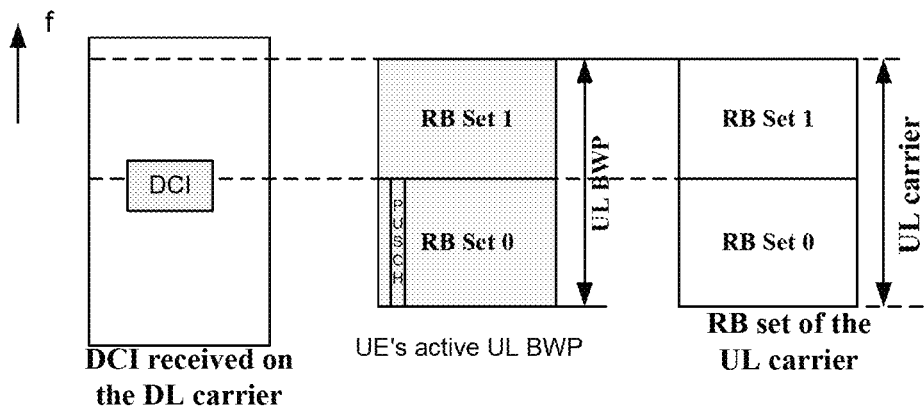
FIG. 8I is still another schematic diagram of the DL carrier not configured with an intra-cell guard band.

FIG. 8I is still another schematic diagram of the DL carrier not configured with an intra-cell guard band. As shown in FIG. 8I, the DL carrier is not configured with an intra-cell guard band, and the UL carrier is also not configured with an intra-cell guard band. Therefore, RB set 0 of the active UL BWP is used as the predefined RB set to transmit the PUSCH.

Considering that in the case where the DL carrier is not configured with an intra-cell guard band (or in other words, the DL carrier is configured as having no intra-cell guard band), there may exist no corresponding definition of an RB set in the downlink, hence, which of the RB sets of the UL BWP is used cannot be determined in dependence on RB sets of the DL BWP. In the above examples 4, 5 and 6, which RB set in the UL BWP is used and the UL BWP are not in dependence on the RB sets of the DL BWP, hence, in the case where the downlink carrier (DL carrier) is configured as having no intra-cell guard band (or the DL carrier is not configured with an intra-cell guard band), the terminal equipment may also determine the RB set in the UL BWP for transmitting the uplink transmission (such as the PUSCH). And furthermore, the above Example 4, Example 5 or Example 6 may also be combined with other examples, for example, in the case where the DL carrier is not configured with an intra-cell guard band (or the DL carrier is configured as having no intra-cell guard band), the predefined resource block set is as described in the above Example 4, Example 5 or Example 6, and in the case where the DL carrier is configured with an intra-cell guard band, the predefined resource block set is as described in one of the following examples.

Example 7: in a case where the DL carrier is configured with an intra-cell guard band, if the uplink bandwidth part (i.e. the active bandwidth part (active UL BWP)) has a resource block set (RB set) overlapping with an RB set in the DL BWP where the first reference resource is located, the predefined RB set may be a resource block set in the uplink bandwidth part (UL BWP) overlapping with the RB set in the DL BWP where the first reference resource is located, wherein if the number of resource block sets in the UL BWP overlapping with the RB set in the DL BWP where the first reference resource is located is two or more, the predefined resource block set may include a resource block set with a lowest frequency-domain position or a smallest index value in two or more resource block sets in the UL BWP overlapping with the RB set in the DL BWP where the first reference resource is located.

Figure 8J:
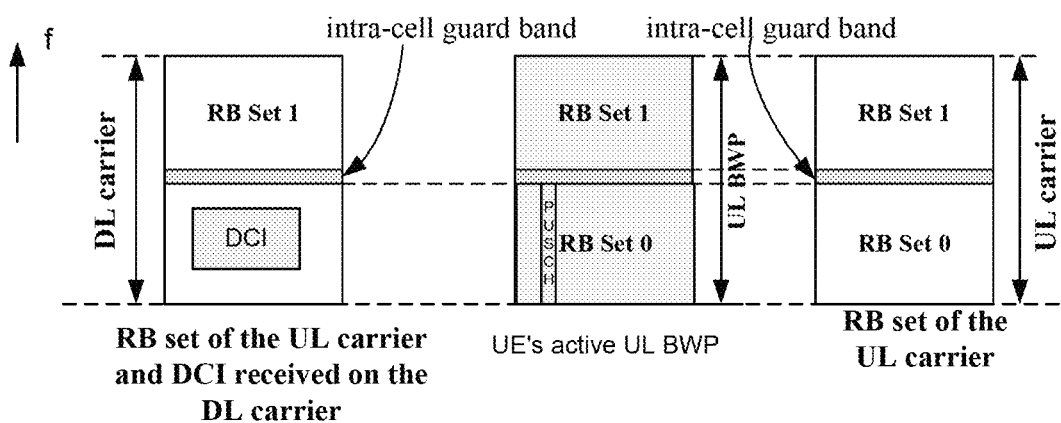
FIG. 8J is a schematic diagram of a DL carrier configured with an intra-cell guard band.

FIG. 8J is a schematic diagram of a DL carrier configured with an intra-cell guard band. As shown in FIG. 8J, the DL carrier is provided with an intra-cell guard band, and the UL carrier is also provided with an intra-cell guard band. It is assumed that RB set 0 in the active bandwidth part (active UL BWP) in FIG. 8J overlaps with the RB set in the DL BWP where the first reference resource is located. Therefore, RB set 0 of the active UL BWP is used as the predefined RB set to transmit the PUSCH.

Figure 8K:
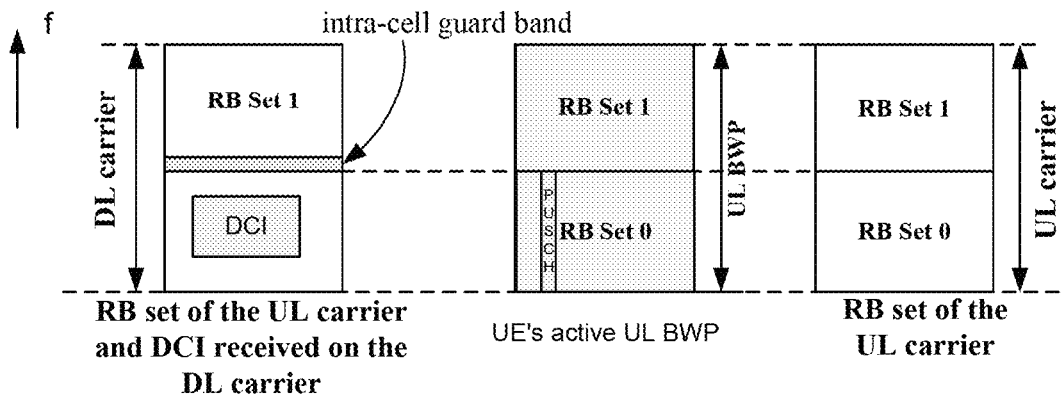
FIG. 8K is another schematic diagram of the DL carrier configured with an intra-cell guard band.

FIG. 8K is another schematic diagram of the DL carrier configured with an intra-cell guard band. As shown in FIG. 8K, the DL carrier is configured with an intra-cell guard band, and the UL carrier is not configured with an intra-cell guard band. It is assumed that RB set 0 in the active bandwidth part (active UL BWP) in FIG. 8K overlaps with the RB set in the DL BWP where the first reference resource is located. Therefore, RB set 0 of the active UL BWP is used as the predefined RB set to transmit the PUSCH. Example 8: in the case where the DL carrier is configured with an intra-cell guard band, if the uplink bandwidth part (i.e. the active bandwidth part (active UL BWP)) does not have a resource block set (RB set) overlapping with the RB set in the DL BWP where the first reference resource is located, the predefined RB set may be a resource block set with a lowest frequency-domain position or a smallest index value in the uplink bandwidth part (UL BWP).

Figure 8L:
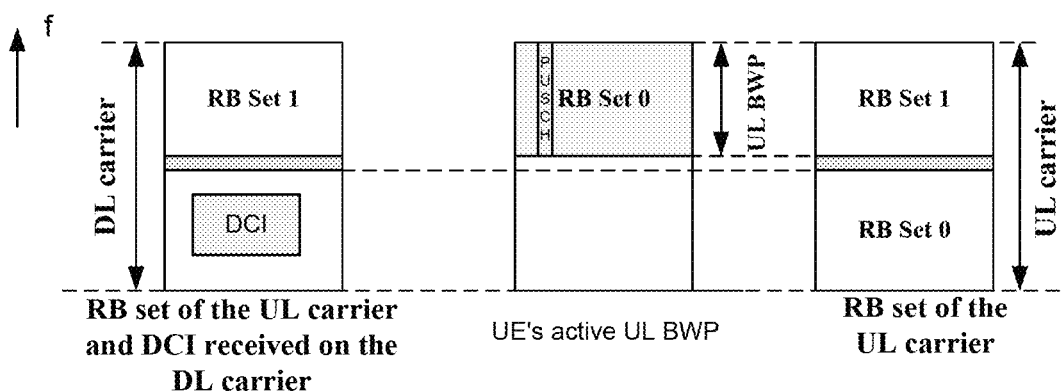
FIG. 8L is a further schematic diagram of the DL carrier configured with an intra-cell guard band.

FIG. 8L is a further schematic diagram of the DL carrier configured with an intra-cell guard band. As shown in FIG. 8L, the DL carrier is configured with an intra-cell guard band, and the UL carrier is also configured with an intra-cell guard band. Assuming that the active part of the bandwidth (active UL BWP) in FIG. 8L does not have an RB set overlapping with the RB set in the DL BWP where the first reference resource is located, the resource block set with the smallest index value of the active UL BWP (i.e. RB set 0) is used as the predefined RB set to transmit the PUSCH.

In some embodiments, the indication information includes: a random access response (RAR) in a random access procedure, or downlink control information having downlink control information format 0_0 and scrambled by a TC-RNTI.

For example, the at least one resource block set is predefined, and the predefined resource block set includes at least one of the following:

an uplink resource block set in the at least two resource block sets with which the downlink resource block set where the frequency-domain resource for transmitting the indication information is located is linked;

an uplink resource block set, in the at least two resource block sets, corresponding to the frequency-domain resource for transmitting the indication information;

a resource block set, in the at least two resource block sets, overlapping with an initial uplink bandwidth part;

a resource block set, in the at least two resource block sets, overlapping with a part or all of resource block sets included in the initial uplink bandwidth part;

a part or all of resource block sets in the at least two resource block sets; and a resource block set, in the at least two resource block sets, for transmitting a random access preamble sequence to which the uplink transmission corresponds.

The predefined RB sets are only schematically illustrated above; however, this disclosure is not limited thereto. And furthermore, one or any combination of the above resource block sets may be used, and one or more of them may be used preferentially, and specific implementations are not limited in this disclosure.

Furthermore, the above method for predefining resource block sets may be combined with certain conditions.

Example 9: if the uplink bandwidth part (i.e. the active uplink bandwidth part (active UL BWP)) and the second reference resource have overlapped resource block sets (RB sets), the predefined resource block set includes: a resource block set in the bandwidth part overlapping with the second reference resource.

Example 10: if the uplink bandwidth part (i.e. the active uplink bandwidth part (active UL BWP)) and the second reference resource do not have an overlapped resource block set (RB set), the predefined resource block set includes: a resource block set in the uplink bandwidth part for transmitting a random access preamble or physical random access channel (PRACH). Wherein, the preamble or PRACH is a preamble or PRACH transmitted before the terminal equipment receives a random access response (including an RAR UL grant) in a random access procedure or receives downlink control information having downlink control information format 0_0 and scrambled by a TC-RNTI (DCI format 0_0 addressed to TC-RNTI).

In the above examples 9 and 10, for uplink transmission (e.g. the PUSCH) scheduled by DCI format 0_0 addressed to TC-RNTI, the second reference resource includes all or a part of resources for transmitting the downlink control information second reference resource (e.g. the downlink control information having downlink control information format 0_0 and scrambled by the TC-RNTI); and for the uplink transmission (the PUSCH) scheduled by the RAR UL grant, the second reference resource includes first downlink control information for transmitting first downlink control information for scheduling a physical downlink shared channel (PDSCH) carrying a random access response, for example, the first downlink control information has a downlink control information format 1_0 (DCI format 1_0).

Example 11: if the uplink bandwidth part (i.e. the active uplink bandwidth part (active UL BWP)) completely overlaps with the initial uplink bandwidth part (initial UL BWP), the predefined resource block set includes: resource block sets in the initial uplink bandwidth part, or resource block sets in the uplink bandwidth part overlapping with the initial uplink bandwidth part.

Figure 8M:
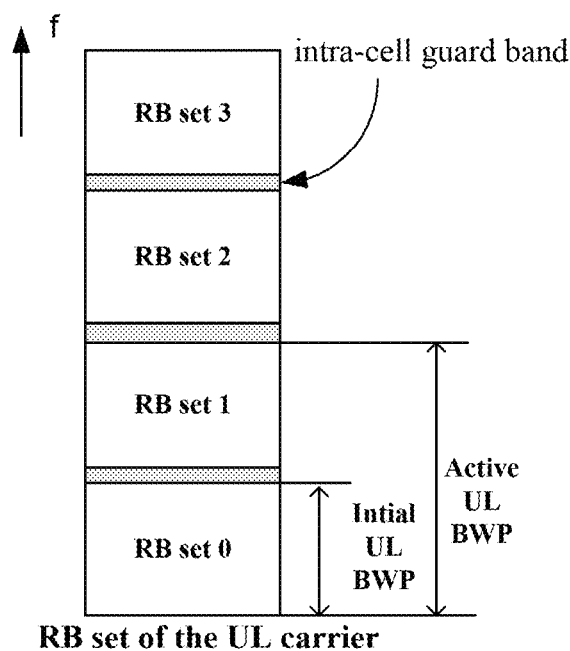
FIG. 8M is a schematic diagram of complete overlapping.

FIG. 8M is a schematic diagram of complete overlapping. As shown in FIG. 8M, the active UL BWP and the initial UL BWP have same SCS and same CP length and the active UL BWP includes all RBs of the initial UL BWP. Furthermore, as shown in FIG. 8M, the UL carrier may be configured with an intra-cell guard band.

Figure 8N:
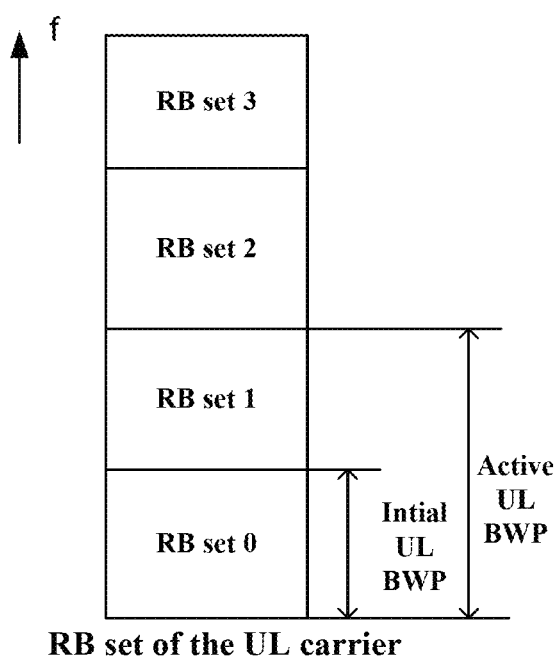
FIG. 8N is another schematic diagram of the complete overlapping.

FIG. 8N is another schematic diagram of the complete overlapping. As shown in FIG. 8N, the active UL BWP and the initial UL BWP have same SCS and same CP length and the active UL BWP includes all RBs of the initial UL BWP. Furthermore, as shown in FIG. 8N, the UL carrier is not configured with an intra-cell guard band.

Example 12: if the uplink bandwidth part (i.e. the active uplink bandwidth part (active UL BWP)) and the initial uplink bandwidth part (initial UL BWP) do not completely overlap, the predefined resource block set includes: a resource blocks set used for transmitting a random access preamble sequence in the random access procedure in the uplink bandwidth part.

Considering that the downlink may possibly have no corresponding definition of an RB set in the case where the DL carrier is not configured with an intra-cell guard band (or the DL carrier is configured as having no intra-cell guard band), which RB set of the UL BWP is used cannot be determined in dependence on the RB sets of the DL BWP. For the PUSCH scheduled by the DCI 0_0 addressed to the TC-RNTI or the RAR UL grant, in the above example 7, 8 or 9, which RB set of the UL BWP is used and the UL BWP are not in dependence on the RB sets of the DL BWP, even if in the case where the DL carrier is not configured with an intra-cell guard band (or in other words, the DL carrier is configured as having no intra-cell guard band), the terminal equipment may be supported to determine a RB set where the resource for transmitting the PUSCH is located; and in contention-based random access (CBRA), even if the network device is unable to acknowledge the active UL BWP of the terminal equipment, it may easily determine the resources used by the terminal equipment to transmit uplink transmission, which will not affect scheduling other terminal equipments, and ensure performance of the communication system. On the other hand, in configuring the PRACH and the UL BWP where the PRACH is located, the network device configures the subcarrier spacing (SCS) of the PRACH to be the same as the SCS of the UL BWP. Therefore, when the terminal equipment transmits a random preamble sequence before receiving the indication information, the subcarrier spacing (SCS) of the physical random access channel (PRACH) used for transmitting the random access preamble sequence is same as the subcarrier spacing (SCS) of the uplink bandwidth part (UL BWP) where the physical random access channel (PRACH) is located. In this way, in CBRA, the network device may determine bits used for indicating frequency-domain resources and included in DCI 0_0 scrambled by the RAR UL grant and/or the TC-RNTI according to the received SCS of the PRACH, and the terminal equipment may still determine the bits used for indicating frequency-domain resources and included in DCI 0_0 scrambled by the RAR UL grant and/or the TC-RNTI according to the active UL BWP, hence, the network device and the terminal equipment may have the same understanding on allocated interlaces for transmitting PUSCHs. This may lower complexity of receiving the PUSCH by the network device, scheduling of other terminal equipments by the network device will not be affected, and performance of the communication system may be ensured.

Furthermore, in some contention-free random access (CFRA) procedures, the terminal equipment may possibly also receive an RAR UL grant, for example, these contention-free random access procedures are: CFRA triggered by a physical downlink control channel (PDCCH) order, CFRA used for obtaining TA of an STAG, or CFRA used for handover, etc. The RAR UL grant received in the CFRA may include information for indicating interlaces and information for indicating RB sets, or information for indicating interlaces, but does not include information for indicating RB sets.

Different from CBRA, in a CFRA procedure, the network device may determine a current active UL BWP of the terminal equipment. In the CFRA procedure, the terminal equipment may determine the resource for transmitting the uplink transmission (PUSCH) in the following ways:

mode 1: in order to lower complexity of the design to simplify implementations of the terminal equipment and lower cost of product development, for the RAR UL grant in the CFRA procedure, the terminal equipment may use the same method as Example 7, Example 8, Example 9 or Example 10 to determine the resources for transmitting the PUSCH;

mode 2: in order to improve a data transmission efficiency, for RAR UL grants received in CFRA and CBRA, the terminal equipment may use different methods to determine the resources for transmitting the PUSCH; for example, for the RAR UL grants received in CFRA and CBRA, the terminal equipment may determine bits of the RAR UL grant used to indicate frequency-domain resources according to the active UL BWP and the initial UL BWP respectively; in particular, for example, in the CFRA triggered by the PDCCH order, the terminal equipment determines the bits of the RAR UL grant for indicating the frequency-domain resources according to the active UL BWP; and in CBRA, the terminal equipment determines the bits of the RAR UL grant for indicating the frequency-domain resources according to the initial UL BWP.

In at least one embodiment, the at least one resource block set is configured by higher-layer signaling, the higher-layer signaling configuring a linking relationship between an uplink resource block set and a downlink resource block set, or the higher-layer signaling configuring the uplink resource block sets scheduled by the indication information.

In some embodiments, an index of a resource block set is predefined. For example, the index of the resource block set is predefined based on a carrier (or per carrier). If a (UL/DL) carrier includes N1 (UL/DL) RB sets, for example, according to an ascending order of frequency positions, indices of N1 RB sets are 0, 1, ..., N1−1, respectively. For example, the index of the resource block set is predefined based on a BWP (or per BWP), if a (UL/DL) BWP includes N2 (UL/DL) RB sets, for example, according to an ascending order of frequency positions, indices of N1 RB sets are 0, 1, ..., N2−1. One resource block set.

In some embodiments, the index of the resource block set is indicated by higher-layer signaling. The index indicated by the higher-layer signaling may also be indicated based on a carrier or based on a BWP.

In some embodiments, on one carrier, one resource block set may have carrier-based indices and BWP-based indices.

In some embodiments, there exists a linking relationship between the DL RB set and the UL RB set. The linking relationship between the DL RB set and the UL RB set here refers to, for example, that when the terminal equipment receives the indication information for scheduling the uplink transmission on the DL RB set, if the indication information does not include the indication field for indicating the UL RB set, or the indication information includes an indication field for indicating the UL RB set but the terminal equipment ignores the indication field, the terminal equipment transmits the uplink transmission at the UL RB set with/to which the DL RB set is linked/corresponds.

In general, a DL RB set may be linked/associated/paired with/corresponds to one or more than one UL RB set. And one UL RB set may be associated with/corresponds to one or more than one DL RB set.

In some embodiments, the linking relationship between the DL RB set and the UL RB set is predefined. The pre-definition is, for example, pre-definition according to a frequency-domain position of a resource block set or an index of the resource block set.

For example, if a frequency range of RBs included in a DL RB set is greater than a frequency range of RBs included in a UL RB set, the UL RB set is the UL RB set linked with the DL RB set. For example, the DL RB set has the same index as the linked UL RB set. That is, a DL RB set with an index n (n is a natural number) is linked with/corresponds to the UL RB set with an index n (n is a natural number).

In some embodiments, the linking relationship between the DL RB set and the UL RB set is indicated by higher-layer signaling. The higher-layer signaling indication indicates, for example, according to the indices of the resource block sets.

In some embodiments, the linking relationship between the DL RB set and the UL RB set is carrier-based or BWP-based. The carrier-based, for example, refers to determining the linking relationship between the DL RB set and the UL RB set according to RB sets included in an uplink carrier and a downlink carrier. The BWP-based, for example, refers to determining a linking relationship between DL RB sets in the UL BWP and RB sets included in the DL BWP linked with the UL BWP according to the UL BWP and the RB sets included in the DL BWP linked with the UL BWP.

Figure 9:
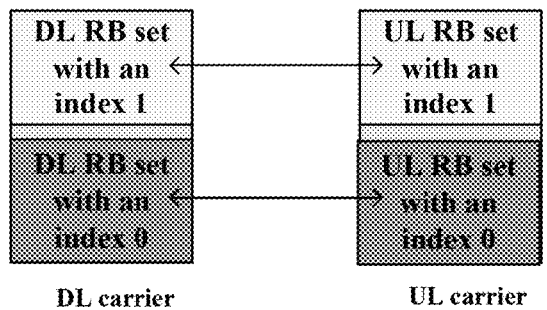
FIG. 9 is an exemplary diagram of a relationship between downlink RB sets of a downlink carrier and uplink RB sets of an uplink carrier of an embodiment of this disclosure.

FIG. 9 is an exemplary diagram of a relationship between the downlink RB sets of the downlink carrier and the uplink RB sets of the uplink carrier of the embodiment of this disclosure, wherein an index of an RB set is defined per carrier.

Figure 10:
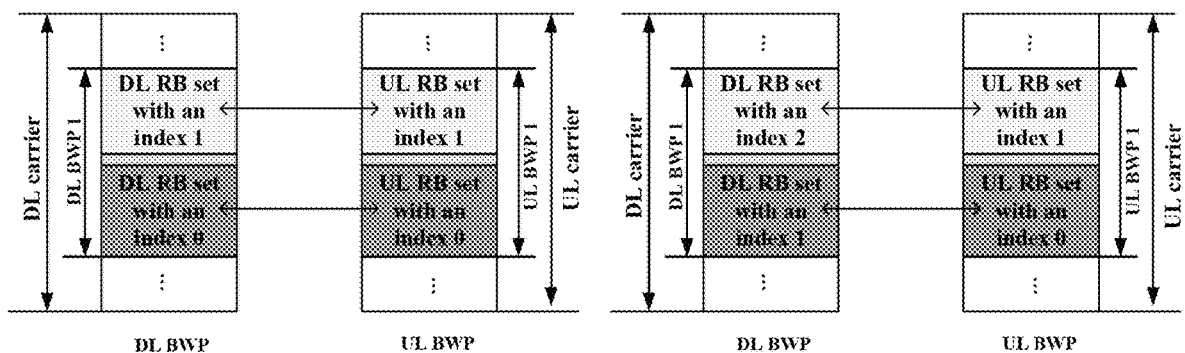
FIG. 10 is an exemplary diagram of a relationship between downlink RB sets of a downlink BWP and uplink RB sets of an uplink BWP of an embodiment of this disclosure.

FIG. 10 is an exemplary diagram of a link/correspondence/association relationship between the downlink RB sets of the downlink BWP and the uplink RB sets of the uplink BWP of the embodiment of this disclosure, wherein an index of an RB set is defined per carrier or per BWP.

Figure 11:
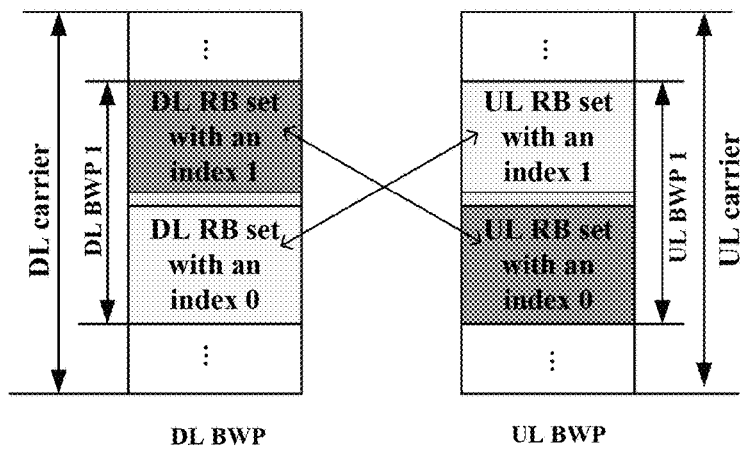
FIG. 11 is another exemplary diagram of the relationship between downlink RB sets of a downlink BWP and uplink RB sets of an uplink BWP of an embodiment of this disclosure.

FIG. 11 is another exemplary diagram of the link/correspondence/association relationship between the downlink RB sets of the downlink BWP and the uplink RB sets of the uplink BWP of the embodiment of this disclosure.

FIG. 12 is a further exemplary diagram of the link/correspondence/association relationship between the downlink RB sets of the downlink BWP and the uplink RB sets of the uplink BWP of the embodiment of this disclosure.

Hence, the configuration of the network device may be not restricted, and processing may be performed by the terminal equipment. For example, if the terminal equipment receives the DCI format 0_0 scheduling uplink transmission on the UL BWP including at least two RB sets, it transmits the uplink transmission on the RB set that is predefined or configured (or indicated by higher-layer signaling).

In some embodiments, the terminal equipment receives indication information for scheduling the terminal equipment to transmit uplink transmission, the indication information including an indication field for indicating resource block sets, and the terminal equipment transmits the uplink transmission on at least one of the resource block sets indicated by the indication field.

For example, the indication information is downlink control information having downlink control information format 0_0, or downlink control information having downlink control information format 0_2, or a random access response (RAR). And furthermore, a size of the indication field may be determined according to the number of RB sets in the active UL BWP.

Therefore, by adding the RB set indication field in the indication information, the terminal equipment is able to determine the resources used for the uplink transmission, so that the uplink transmission may be transmitted and received correctly.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the terminal equipment may be supported to determine the resource used for uplink transmission, so that the uplink transmission may be transmitted and received correctly.

Embodiment of a Third Aspect

In a case where a terminal equipment is instructed to perform BWP switch, the terminal equipment may possibly not be able to determine the resource for uplink transmission, which may cause the uplink transmission to be unable to be transmitted and received correctly.

For example, in an existing scheme, a size/number of bits of an FDRA indication field (including a size/number Y of bits of an indication field used for indicating RB sets) is/are determined according to a BWP where uplink transmission is located. If indication information for scheduling the terminal equipment to transmit uplink transmission (such as DCI format 0_1) includes an indication field for indicating a BWP and the indication field instructs the terminal equipment to switch an uplink BWP (such as switching from an active UL BWP, i.e. a first UL BWP, to a second UL BWP), if the above scheme is adopted, the terminal equipment will not be able to transmit the uplink transmission correctly. This is because, before the terminal equipment receives the indication information, it is unable to determine a BWP on which the terminal equipment transmits the uplink transmission instructed by the indication information, and hence, it is unable to determine a size/number of bits of an FDRA indication field of the indication information according to the above method, thereby resulting in the terminal equipment being unable to receive the indication information, and being unable to transmit the uplink transmission correctly.

For another example, if the indication information (such as DCI format 0_1) used for scheduling the terminal equipment to transmit uplink transmission includes an indication field for indicating BWPs, and the number of bits of an FRDA (frequency domain resource assignment) indication field included in the indication information is determined according to an SCS and/or the number of RB sets of the active UL BWP, i.e. the first UL BWP, while the indication field for indicating BWPs instruct the terminal equipment to switch the uplink BWP (such as switching from the active UL BWP, i.e. the first UL BWP, to the second UL BWP), the SCSs of the first UL BWP and the second UL BWP and/or the numbers of RB sets included therein may be different. There exists currently no corresponding scheme supporting the terminal equipment to determine frequency-domain resources on the second UL BWP for transmitting uplink transmission, which will result in erroneously determining resources for uplink transmission, thereby causing the terminal equipment to be unable to transmit the uplink transmission correctly.

Addressed to at least one of the above problems, the embodiment of this disclosure provides an uplink transmission method, which shall be described from a terminal equipment side. The embodiment of this disclosure may be implemented in combination with the embodiments of the first and second aspects, or may be implemented separately, with contents identical to those in the embodiments of the first and second aspects being not going to be described herein any further.

FIG. 13 is a schematic diagram of the uplink transmission method of the embodiment of this disclosure. As shown in FIG. 13, the method includes:

1301: a terminal equipment receives indication information used for scheduling the terminal equipment to transmit uplink transmission; and

1302: a frequency-domain resource allocation (FRDA) bit number is determined according to a subcarrier spacing (SCS) of an active uplink bandwidth part when the indication information is received and/or the number of resource block sets included in the active uplink bandwidth part, or, an FRDA bit number is determined according to a carrier where the uplink transmission is located or the subcarrier spacing (SCS) of the active uplink bandwidth part and/or the number of resource block sets included in the carrier where the uplink transmission is located, or, an FRDA bit number is determined according to a subcarrier spacing (SCS) of a specific active uplink bandwidth part in at least one configured uplink bandwidth part and/or the number of resource block sets included in the active uplink bandwidth part.

It should be noted that FIG. 13 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 13.

In some embodiments, the indication information includes: downlink control information having downlink control information format 0_1, downlink control information having downlink control information format 0_2, downlink control information having downlink control information format 0_0 or a random access response (RAR) in a random access procedure.

In some embodiments, an FRDA (frequency domain resource assignment) bit number is related to an SCS and/or the number of RB sets.

In some embodiments, the frequency domain resource assignment (FRDA) bit number is determined according to a subcarrier spacing (SCS) of an active uplink bandwidth part when the indication information is received and/or the number of resource block sets included therein.

For example, if a PUSCH is transmitted by using interlaced resource blocks (that is, by using uplink frequency resource allocation Type 2) (such as when useInterlace-PUSCH-Dedicated-r16 is configured), in a case where the SCS of the active uplink bandwidth is 30 kHz, the FRDA bit number is 5 bits, and in a case where the SCS of the active uplink bandwidth is 15 kHz, the FRDA bit number is 6 bits.

For example, if a PUSCH is transmitted by using interlaced resource blocks (that is, by using uplink frequency resource allocation Type 2) (such as when useInterlace-PUSCH-Dedicated-r16 is configured), in a case where the SCS of the active uplink bandwidth is 30 kHz, the FRDA bit number is 5+Y bits, and in a case where the SCS of the active uplink bandwidth is 15 kHz, the FRDA bit number is 6+Y bits, wherein a value of Y is determined according to $$\left\lceil \log_2\left(\frac{N(N+1)}{2}\right) \right\rceil;$$

where, N is the number of RB sets included in the active UL BWP.

In some embodiments, the FRDA bit number is determined according to a carrier where the uplink transmission is located or the subcarrier spacing of the active uplink bandwidth part, and/or the number of resource block sets included in the carrier where the uplink transmission is located.

For example, if a PUSCH is transmitted by using interlaced resource blocks (that is, by using uplink frequency resource allocation Type 2) (such as when useInterlace-PUSCH-Dedicated-r16 is configured), in a case where the SCS of the uplink carrier is 30 kHz, the FRDA bit number is 5+Y bits, and in a case where the SCS of the uplink carrier is 15 kHz, the FRDA bit number is 6+Y bits, wherein a value of Y is determined according to $$\left\lceil \log_2\left(\frac{N(N+1)}{2}\right) \right\rceil;$$

where, N is the number of RB sets included in the uplink carrier.

For another example, if a PUSCH is transmitted by using interlaced resource blocks (that is, by using uplink frequency resource allocation Type 2) (such as when useInterlacePUSCH-Dedicated-r16 is configured), in a case where the SCS of the active uplink bandwidth is 30 kHz, the FRDA bit number is 5+Y bits, and in a case where the SCS of the active uplink bandwidth is 15 kHz, the FRDA bit number is 6+Y bits, wherein a value of Y is determined according to $$\left\lceil \log_2\left(\frac{N(N+1)}{2}\right) \right\rceil;$$

where, N is the number of RB sets included in the uplink carrier.

In some embodiments, the frequency domain resource assignment (FRDA) bit number is determined according to a subcarrier spacing (SCS) of a specific uplink bandwidth part in at least one configured uplink bandwidth part and/or the number of resource block sets included therein.

For example, if a PUSCH is transmitted by using interlaced resource blocks (that is, by using uplink frequency resource allocation Type 2) (such as when useInterlace-PUSCH-Dedicated-r16 is configured), in a case where an SCS of a specific uplink bandwidth part in at least one configured uplink bandwidth part is 30 kHz, the FRDA bit number is 5+Y bits, and in a case where an SCS of a specific uplink bandwidth part in at least one configured uplink bandwidth part is 15 kHz, the FRDA bit number is 6+Y bits, wherein a value of Y is determined according to $$\left\lceil \log_2\left(\frac{N(N+1)}{2}\right)\right\rceil,$$

where, N is the number of RB sets included in the specific uplink bandwidth part in the at least one configured uplink bandwidth part.

In some embodiments, the terminal equipment needs to determine a specific uplink bandwidth part in at least one configured uplink bandwidth part. For example, in the at least one configured UL BWP, the number of bits in an FDRA indication field determined according to the SCS and/or the number of RB sets of the specific UL BWP is largest.

Hence, the frequency-domain resource allocation (FRDA) bit number of is determined according to the subcarrier spacing (SCS) of the active uplink bandwidth part and/or the number of resource block sets included therein when the indication information is received; or, the FRDA bit number is determined according to a carrier where the uplink transmission is located or the subcarrier spacing of the active uplink bandwidth part and/or the number of resource block set included in the carrier where the uplink transmission is located; or, the frequency-domain resource allocation (FRDA) bit number of is determined according to the SCS of the specific uplink bandwidth part in the at least one configured uplink bandwidth part and/or the number of resource block set included therein, thereby supporting the terminal equipment to determine a size/the number of bits of the FDRA indication field of the indication information including the indication field for indicating BWPs. Even if the indication field for indicating BWPs in the indication information instructs the terminal equipment to switch the uplink BWP (such as switching from the active UL BWP, i.e. the first UL BWP, to the second UL BWP), the terminal equipment is able to receive the indication information, so that the uplink transmission is transmitted and received correctly.

In some embodiments, if a PUSCH is transmitted by using interlaced resource blocks (that is, by using uplink frequency resource allocation Type 2) (such as when useInterlacePUSCH-Dedicated-r16 is configured), the indication information does not include an indication field for indicating a bandwidth part (BWP); or, the indication information includes an indication field for indicating a bandwidth part (BWP) and the terminal equipment ignores the indication field for indicating a bandwidth part (BWP) included in the indication information.

For example, if the higher-layer parameter useInterlacePUSCH-Dedicated-r16 is configured, DCI format 0_1 does not include a bandwidth part indicator; or, even if the terminal equipment receives DCI format 0_1 and DCI format 0_1 includes the bandwidth part indicator, the terminal equipment ignores the bandwidth part indicator.

Therefore, if a PUSCH is transmitted by using interlaced resource blocks (that is, by using uplink frequency resource allocation Type 2) (such as when useInterlacePUSCH-Dedicated-r16 is configured), the indication information is unable to instruct the terminal equipment to switch the UL BWP, thereby avoiding occurrence of the above problems.

In some embodiments, the indication information includes an indication field for indicating a BWP, and the indication field indicates a second UL BWP different from the active UL BWP, i.e. the first UL BWP.

In some embodiments, in a case where the terminal equipment is configured to transmit the uplink transmission by using interlaced frequency-domain resources, the terminal equipment expects or determines that a subcarrier spacing (SCS) of the first uplink bandwidth part) is identical to an SCS of the second uplink bandwidth part.

For example, if the higher-layer parameter useInterlacePUSCH-Dedicated-r16 is configured and DCI format 0_1 instructs the terminal equipment to switch the UL BWP, the SCS of the second UL BWP should be identical to that of the first UL BWP.

For another example, if the higher-layer parameter useInterlacePUSCH-Dedicated-r16 is configured, SCSs of all UL BWPs in at least one configured UL BWP should be identical, or the uplink carrier is configured with only one SCS.

In some embodiments, the terminal equipment further expects or determines that the number of resource block sets on the first uplink bandwidth part and the number of resource block sets on the second uplink bandwidth part are identical.

For example, if the higher-layer parameter useInterlacePUSCH-Dedicated-r16 is configured and DCI format 0_1 instructs the terminal equipment to switch the UL BWP, the SCS of the second UL BWP and the SCS of the first UL BWP should be identical, and numbers thereof should also be identical when RB sets are configured.

For another example, if the higher-layer parameter useInterlacePUSCH-Dedicated-r16 is configured, SCSs of all UL BWPs in the at least one configured UL BWP and the numbers of RB sets included therein should be identical, or the uplink carrier configures only one SCS and the numbers of RB sets included in all UL BWPs in the at least one configured UL BWP should be identical.

Hence, the configuration of the network device may be restricted, so that the terminal equipment may be supported to determine the resources for uplink transmission, and the uplink transmission may be transmitted and received correctly.

In some embodiments, the terminal equipment ignores the indication field used for indicating resource block sets in the indication information.

For example, for SCSs, if DCI format 0_1 instructs the terminal equipment to switch the UL BWP, the SCSs of the second UL BWP and the SCSs of the first UL BWP should be identical. And furthermore, for RB sets, the terminal equipment may ignore the indication field in the DCI for indicating resource block sets (i.e. the Y bit information when the FDRA includes 5/6+Y bits), and determine the RB sets by using, for example, the method described in the embodiment of the second aspect.

For example, an uplink resource block set in the RB sets of the second UL BWP linked with the downlink resource block set where the frequency-domain resource for transmitting the indication information is located may be used; or, an uplink resource block set in the RB sets of the second UL BWP corresponding to the frequency-domain resource for transmitting the indication information may be used, and so on.

The case where the configuration of the network device is restricted and the terminal equipment ignores the indication field is described above, and furthermore, the indication field in the DCI may also be reinterpreted.

In some embodiments, the terminal equipment determines the frequency-domain resources on the second uplink bandwidth part for transmitting the uplink transmission according to the subcarrier spacings of the first uplink bandwidth part and the second uplink bandwidth part and/or the number of resource block sets included therein.

In some embodiments, the terminal equipment determines an actual FRDA bit number of the first uplink bandwidth part and an assumed FRDA bit number of the second uplink bandwidth part, and determines the frequency-domain resource for transmitting the uplink transmission on the second uplink bandwidth part according to the actual FRDA bit number and the assumed FRDA bit number.

In some embodiments, the terminal equipment indicates the interlaced frequency resources by using at least one bit in the FRDA indication field of the indication information for indicating resource block sets, and indicates the resource block sets by using at least one bit in the FRDA indication field of the indication information for indicating interlaced frequency resources.

In some embodiments, the terminal equipment ignores at least one bit in the FRDA indication field of the indication information.

For example, min(X1+Y1, X2+Y2) bits in the FRDA indication field of the indication information are used to indicate the frequency-domain resources on the second uplink bandwidth part; wherein min( ) denotes a smaller value operation, X1 and Y1 are the actual FRDA bit number of the first uplink bandwidth part, and X2 and Y2 are the assumed FRDA bit number of the second uplink bandwidth part.

A least significant bit (LSB) of min (X1+Y1, X2) is used to indicate an interlaced frequency-domain resource, and a most significant bit (MSB) of min (X1+Y1−min (X1+Y1, X2), Y2) is used to indicate a resource block set.

If X1+Y1<X2, an interlaced frequency-domain resource that may be indicated by the LSB of min (X1+Y1, X2) is one of former predefined 2^ min (X1+Y1, X2) interlaced frequency-domain resources to which the second uplink bandwidth part corresponds;

and if X1+Y1−min (X1+Y1, X2)<Y2, a resource block set that may be indicated by the MSB of min (X1+Y1−min (X1+Y1, X2), Y2) is one of former predefined 2^ min (X1+Y1−min (X1+Y1, X2), Y2) resource block sets to which the second uplink bandwidth part corresponds.

For another example, min (X1, X2)+min (Y1, Y2) bits in the FRDA indication field of the indication information are used to indicate the frequency-domain resources on the second uplink bandwidth part; wherein min( ) denotes a smaller value operation, X1 and Y1 are the actual FRDA bit number of the first uplink bandwidth part, and X2 and Y2 are the assumed FRDA bit number of the second uplink bandwidth part.

Min (X1, X2) bits in X1 are used to indicate an interlaced frequency-domain resource, and min (Y1, Y2) bits in Y1 are used to indicate a resource block set.

If X1<X2, an interlaced frequency-domain resource that may be indicated by min (X1, X2) is one of former predefined min (X1, X2) interlaced frequency-domain resources to which the second uplink bandwidth part corresponds;

and if Y1<Y2, a resource block set that may be indicated by min (Y1, Y2) is one of former predefined 2^ min (Y1, Y2) bits, Y2) resource block sets to which the second uplink bandwidth part corresponds.

In some embodiments, if Y1=0, the RB sets may be determined by using, for example, the method described in the embodiment of the second aspect. For example, the uplink resource block set in the RB sets of the second UL BWP with which the downlink resource block set where the frequency-domain resource for transmitting the indication information is located is linked may be used; or, an uplink resource block set in the RB sets of the second UL BWP corresponding to the frequency-domain resource for transmitting the indication information may be used, and so on.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the terminal equipment may be supported to determine the resource used for uplink transmission, so that the uplink transmission may be transmitted and received correctly.

Embodiment of a Fourth Aspect

A terminal equipment may be indicated that an uplink carrier or a downlink carrier has no intra-cell guard band; however, there exists currently no corresponding scheme for how to indicate to the terminal equipment that the uplink carrier or the downlink carrier has no intra-cell guard band.

On the other hand, if it is only indicated to the terminal equipment that the uplink carrier or the downlink carrier has no guard band, and the RB sets included in the uplink carrier or the downlink carrier are not indicated, in the case where the terminal equipment is indicated that the frequency resource has no guard band, the terminal equipment may possibly not be able to determine the resources for the uplink transmission, thereby resulting in the uplink transmission being unable to be transmitted and received correctly.

For example, if a PUSCH is transmitted by using inter-laced resource blocks (that is, by using uplink frequency resource allocation Type 2) (such as when useInterlace-PUSCH-Dedicated-r16 is configured), but the higher-layer signaling intraCellGuardBandUL-r16 indicates that there exists no guard band, how to indicate frequency-domain resources is not provided in an existing scheme.

Addressed to at least one of the above problems, the embodiment of this disclosure provides an uplink transmission method, which shall be described from a terminal equipment side. The embodiment of this disclosure may be implemented in combination with the embodiments of the first to the third aspects, or may be implemented separately, with contents identical to those in the embodiments of the first to the third aspects being not going to be described herein any further.

Figure 14:
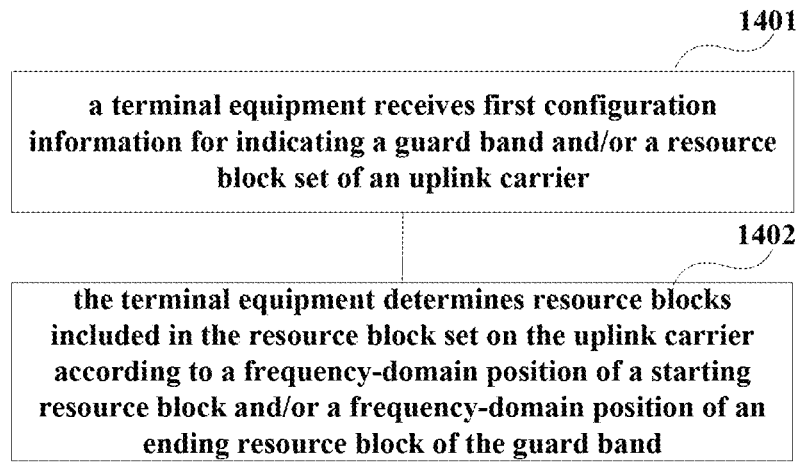
FIG. 14 is still another schematic diagram of the uplink transmission method of the embodiment of this disclosure.

FIG. 14 is a schematic diagram of the uplink transmission method of the embodiment of this disclosure. As shown in FIG. 14, the method includes:

1401: a terminal equipment receives first configuration information for indicating a guard band and/or a resource block set of an uplink carrier; and 1402: the terminal equipment determines resource blocks included in the resource block set on the uplink carrier according to a frequency-domain position of a starting resource block and/or a frequency-domain position of an ending resource block of the guard band.

It should be noted that FIG. 14 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 14.

In some embodiments, the first configuration information further indicates that there exists no guard band. For example, the first configuration information includes intraCellGuardBandUL-r16, or intraCellGuardBandDL-r16.

In some embodiments, the first configuration information (e.g. intraCellGuardBandUL-r16, intraCell GuardBandDL-r16) includes information for indicating a frequency domain position (such as being characterized by a CRB index) of a starting resource block of the guard band and/or a frequency-domain position of an ending resource block of the guard band, and if the frequency-domain position of the starting resource block of the guard band indicated by the first configuration information is higher than or equal to the frequency-domain position of the ending resource block of the guard band, the uplink carrier or downlink carrier has no guard band.

For example, assuming that intraCellGuardBandUL-r16 or intraCellGuardBandDL-r16 indicates 2N CRB indices, i.e. {index 1, index2, . . . index 2N}, a (2n−1)-th and 2n-th CRB indices are a starting CRB index and ending CRB index of an n-th (n=1, 2, . . . , N) guard band, respectively. Wherein, if the (2n−1)-th CRB index is greater than or equal to the 2n-th CRB index (for example, the (2n−1)-th CRB index is equal to the 2n-th CRB index plus 1), there exists no guard band n, that is, there exists no guard band between two RB sets (an n-th RB set and an (n+1)-th RB set) to which the (2n−1)-th and 2n-th CRB indices correspond.

Furthermore, if for n=1, 2, . . . , N, the (2n−1)-th CRB index is greater than or equal to the 2n-th CRB index respectively (for example, the (2n−1)-th CRB index is equal to the 2n-th CRB index plus 1), the uplink carrier or downlink carrier has no guard band.

When an index of a starting common resource block (CRB) of the guard band is equal to an ending CRB index plus 1, the terminal equipment determines, for example, the resource blocks included in the resource block set on the downlink carrier or uplink carrier in a manner as below:

Suppose $N_{GB,x,s}^{start,\mu}$ and $N_{GB,x,s}^{end,\mu}$ respectively denote a starting CRB index and an ending CRB index of the intra-cell guard band indicated by the first configuration information; where, $s \in \{0, 1, \ldots, N_x^{RBset}-2\}$ denotes the index of the guard band, numbered in an ascending order of the CRB indices; for the downlink, x is the DL, for uplink, x is the UL. Then a starting CRB index of an RB set in $N_x^{RBset}$ RB sets with an index of $r \in \{0, 1, \ldots, N_x^{RBset}-1\}$ (numbered in an ascending order of the CRB indices) is:

$$N_{RBset,x,r}^{start,\mu} = \begin{cases} N_{grid,x}^{start,\mu} & r = 0 \\ N_{GB,x,r-1}^{end,\mu} + 1 & \text{otherwise} \end{cases},$$

and an ending CRB index is:

$$N_{RBset,x,r}^{end,\mu} = \begin{cases} N_{grid,x}^{start,\mu} + N_{grid,x}^{size,\mu} - 1 & r = N_x^{RBset} - 1 \\ N_{GB,x,r}^{start,\mu} - 1 & \text{otherwise} \end{cases}.$$

In this way, even if the first configuration information indicates that there exists no intra-cell guard band, the terminal equipment may determine the resource blocks included in the resource block set on the downlink carrier or uplink carrier according to the frequency-domain position (e.g. the CRB index) of the starting resource block and/or the frequency-domain position of the ending resource block of the guard band indicated by the first configuration information, which may support the terminal equipment to determine the resources for downlink transmission or uplink transmission, so that the downlink transmission or uplink transmission may be transmitted and received correctly.

In some embodiments, the first configuration information indicates via a specific value that there exists no guard band. The specific value is, for example, null; however, this disclosure is not limited thereto.

In some embodiments, in a case where the first configuration information indicates that there exists no guard band, resource blocks included in a resource subset of the uplink carrier are predefined.

Hence, with the predefined RB sets, the terminal equipment may be supported to determine the resources for uplink transmission, so that the uplink transmission may be transmitted and received correctly.

In some embodiments, the terminal equipment receives second configuration information indicating the resource block sets of the uplink carrier.

Hence, the terminal equipment configures the RB sets according to other higher-layer signaling, which may support the terminal equipment to determine the resources for uplink transmission, so that the uplink transmission may be transmitted and received correctly.

In some embodiments, the terminal equipment receives third configuration information of the UL BWP of the uplink carrier; if the first configuration information indicates that there exists no guard band, the third configuration information does not include information instructing the terminal equipment to transmit the uplink transmission by using interlaced frequency-domain resources; or, if the third configuration information includes the information instructing the terminal equipment to transmit the uplink transmission by using interlaced frequency-domain resources, the first configuration information does not indicate that there exists no guard band. For example, if the terminal equipment is configured with the higher-layer parameter useInterlacePUSCH-Dedicated-r16, intraCellGuardBandUL-r16 is unable to be used to indicate that there exists no guard band; if intraCellGuardBandUL-r16 is used to indicate that there exists no guard band, the higher-layer parameter useInterlacePUSCH-Dedicated-r16 is not configured.

In some embodiments, the terminal equipment receives indication information for scheduling the terminal equipment to transmit uplink transmission when it is indicated that there exists no frequency guard band; wherein the indication information does not include an indicating field for indicating a resource block set. Or, the indication information includes an indication field for indicating a resource block set, but the terminal equipment ignores the indication field. The method of the embodiment of the second aspect may be used to determine the resource for transmitting the uplink transmission.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the terminal equipment may be supported to determine the resource used for uplink transmission, so that the uplink transmission may be transmitted and received correctly.

Embodiment of a Fifth Aspect

The embodiment of this disclosure provides an uplink transmission method.

Figure 15:
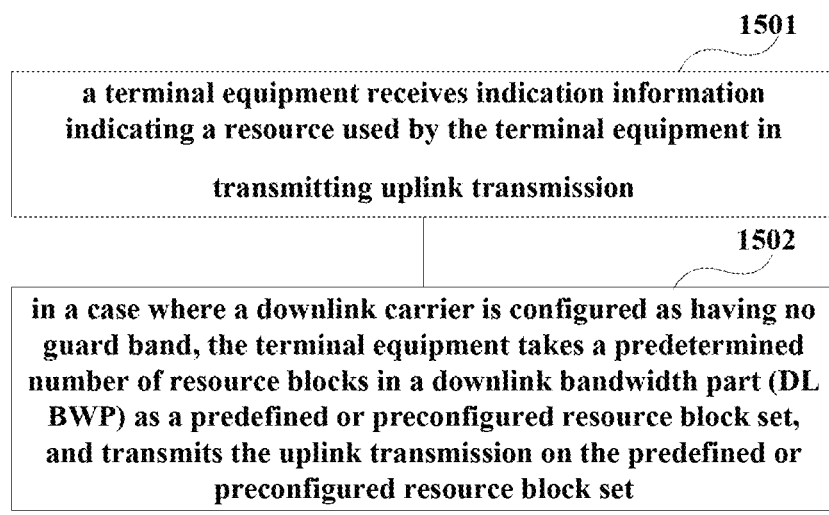
FIG. 15 is yet another schematic diagram of the uplink transmission method of the embodiment of this disclosure.

FIG. 15 is a schematic diagram of the uplink transmission method of the embodiment of the fifth aspect. As shown in FIG. 15, the method includes:

1501: a terminal equipment receives indication information indicating a resource used by the terminal equipment in transmitting uplink transmission; and 1502: in a case where a downlink carrier is configured as having no guard band, the terminal equipment takes a predetermined number of resource blocks in a downlink bandwidth part (DL BWP) as a predefined or preconfigured resource block set, and transmits the uplink transmission on the predefined or preconfigured resource block set.

In at least one embodiment, a predetermined number of resource blocks in one downlink bandwidth part (DL BWP) may be, for example, all resource blocks in one downlink bandwidth part (DL BWP).

In at least one embodiment, the terminal equipment may execute operation 1502 according to a predefined operation or configuration of a network device.

According to the embodiment of the fifth aspect, the RB set is defined for a case where the DL carrier is not configured with an intra-cell guard band.

For example, if the DL carrier is not configured with an intra-cell guard band, RBs in a DL BWP belong to an RB set.

In this way, in the case where the DL carrier is not configured with an intra-cell guard band, the terminal equipment may also determine an RB set in the UL BWP for transmitting the PUSCH according to the RB sets of the DL BWP.

Embodiment of a Sixth Aspect

When a UL carrier is configured with an intra-cell guard band, whether a terminal equipment is able to transmit uplink transmission at the intra-cell guard band is in dependence on a capability of the terminal equipment.

According to an existing resource allocation method, a part of data of a PUSCH may be mapped onto an intra-cell guard band, and if a terminal equipment is limited by a capability of the terminal equipment and is unable to transmit on the intra-cell guard band, the terminal equipment will not be able to transmit this part of data, thereby lowering reliability and efficiency of data transmission.

The embodiment of this disclosure provides an uplink transmission method.

Figure 16A:
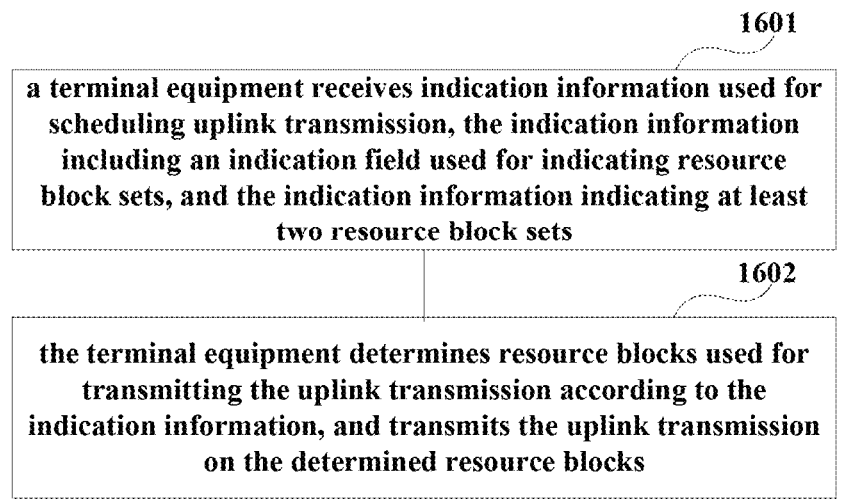
FIG. 16A is yet still another schematic diagram of the uplink transmission method of the embodiment of this disclosure.

FIG. 16A is a schematic diagram of a method of the uplink transmission method of the embodiment of the sixth aspect. As shown in FIG. 16A, the method includes:

1601: a terminal equipment receives indication information used for scheduling uplink transmission, the indication information including an indication field used for indicating resource block sets (RB sets), and the indication information indicating at least two resource block sets (RB sets); and 1602: the terminal equipment determines resource blocks used for transmitting the uplink transmission according to the indication information, and transmits the uplink transmission on the determined resource blocks.

In operation 1601, the indication information may indicate a resource used by the terminal equipment to transmit uplink transmission (e.g. a PUSCH). The PUSCH may be semi-statically/semi-persistently/dynamically scheduled, and the indication information may be DCI 0_0 (in USS), DCI 0_1 or DCI 0_2, or RRC signaling for configuring a CG PUSCH of Type 1 or Type 2. At least two resource block sets (RB sets) indicated by the indication information are consecutive.

In operation 1602, a resource block for transmitting the uplink transmission is determined according to whether the terminal equipment has a predetermined capability or whether it is indicated that the terminal equipment has a predetermined capability and the indication information. The predetermined capability includes: a capability of the terminal equipment to transmit uplink transmission at an intra-cell guard band.

For example, in a case where the terminal equipment indicates that it is able to transmit uplink transmission at an intra-cell guard band, the terminal equipment determines that the resource blocks used for transmitting the uplink transmission are: the at least two resource block sets and an intersection of a resource block in an intra-cell guard band between the at least two resource block sets and the interlaced resource blocks indicated by the indication information.

Figure 16B:
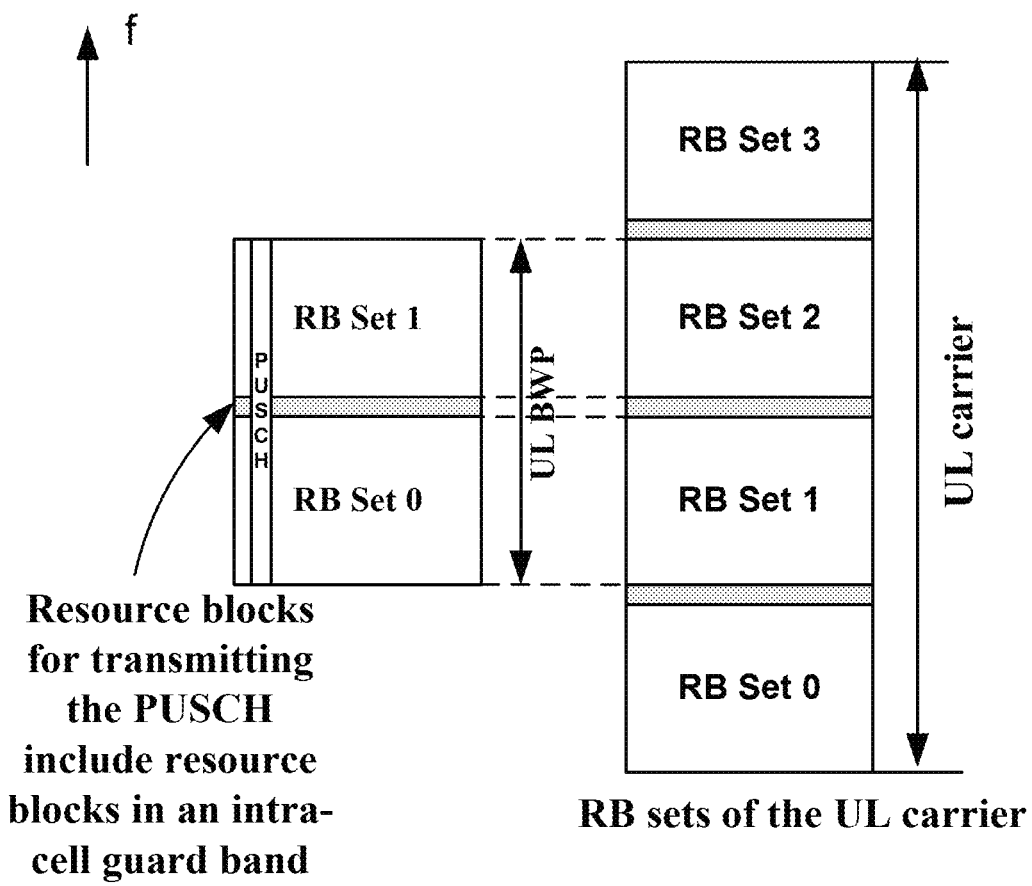
FIG. 16B is a schematic diagram of determining resource blocks by a terminal equipment for transmitting uplink transmission in a case where the terminal equipment indicates that it is able to transmit uplink transmission at an intra-cell guard band.

FIG. 16B is a schematic diagram of determining resource blocks by a terminal equipment for transmitting uplink transmission in a case where the terminal equipment indicates that it is able to transmit uplink transmission at an intra-cell guard band. As shown in FIG. 16B, as the terminal equipment indicates that it is able to transmit uplink transmission at an intra-cell guard band, the resource blocks used for transmitting the PUSCH may include resource blocks in the intra-cell guard band. For another example, in a case where the terminal equipment is able to transmit uplink transmission at an intra-cell guard band and indicates that it is able to transmit uplink transmission at an intra-cell guard band, the terminal equipment determines that the resource blocks used for transmitting the uplink transmission are: the at least two resource block sets and an intersection of a resource block in an intra-cell guard band between the at least two resource block sets and the interlaced resource blocks indicated by the indication information.

For another example, in a case where the terminal equipment does not indicate that it is able to transmit uplink transmission at an intra-cell guard band, the terminal equipment determines that the resource blocks used for transmitting the uplink transmission are: an intersection of the interlaced resource blocks indicated by the indication information and a resource block in the at least two resource block sets.

Figure 16C:
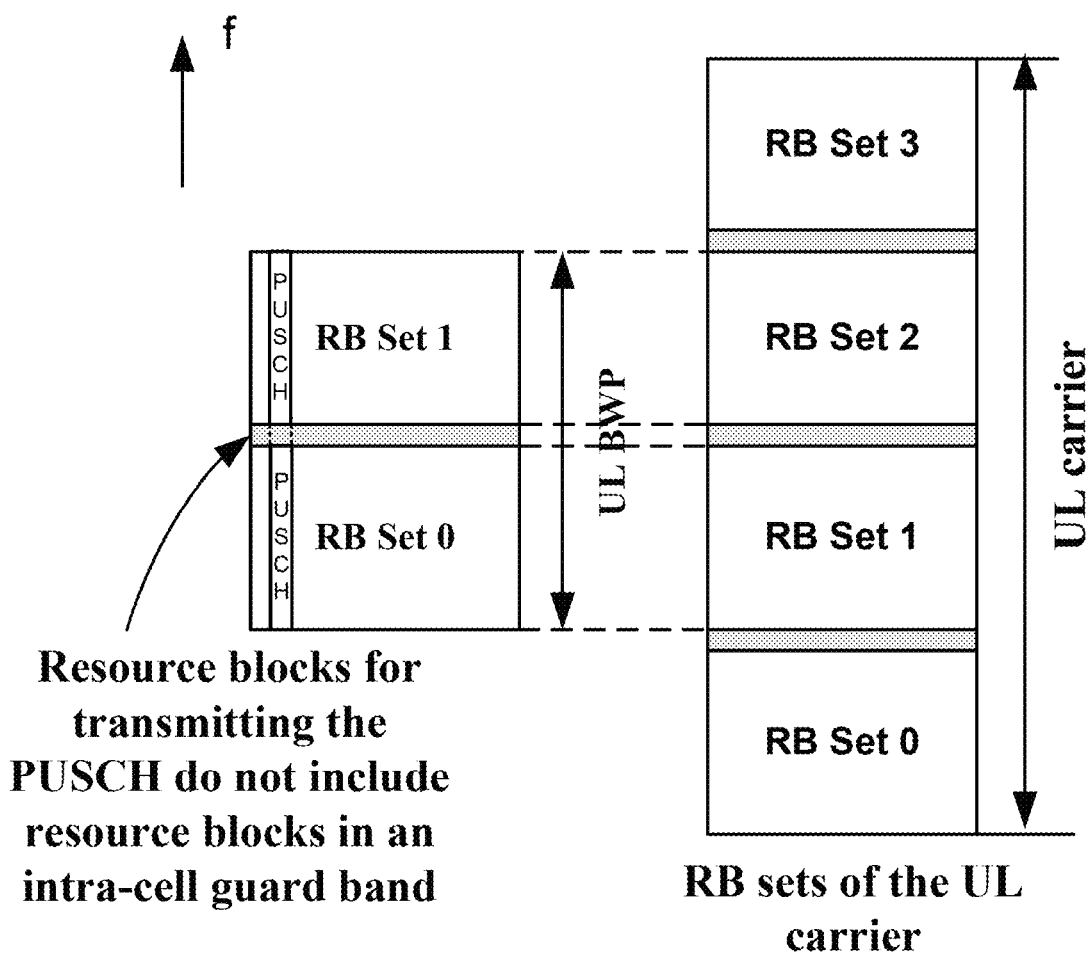
FIG. 16C is a schematic diagram of determining resource blocks by a terminal equipment for transmitting uplink transmission in a case where the terminal equipment does not indicate that it is able to transmit uplink transmission at an intra-cell guard band.

FIG. 16C is a schematic diagram of determining resource blocks by the terminal equipment for transmitting uplink transmission in a case where the terminal equipment does not indicate that it is able to transmit uplink transmission at an intra-cell guard band. As shown in FIG. 16C, as the terminal equipment does not indicate that it is able to transmit uplink transmission at an intra-cell guard band, the resource blocks used for transmitting the PUSCH do not include resource blocks in the intra-cell guard band.

The case where the terminal equipment does not indicate that it is able to transmit uplink transmission at an intra-cell guard band refers to a case where the terminal equipment is able to transmit uplink transmission at the intra-cell guard band, but it does not indicate that it is able to transmit uplink transmission at the intra-cell guard band; or, the terminal equipment is unable to transmit uplink transmission at the intra-cell guard band and does not indicate that it is able to transmit uplink transmission at the intra-cell guard band.

In particular, taking that the PUSCH is dynamically scheduled and the indication information is DCI (such as DCI 0_0 (in USS) or DCI 0_1) as an example, the method for determining the resource blocks for transmitting uplink transmission in operation 1602 may be, for example, as shown in Example 1 or Example 2 below:

Example 1: For DCI 0_0 monitored in a UE-specific search space and DCI 0_1, if the UE indicates the capability of transmitting in intra-cell guard band, the UE shall determine the resource allocation in frequency domain as an intersection of the resource blocks of the indicated interlaces, and resource blocks of the indicated set of RB sets and intra-cell guard bands defined in Clause 7 between the indicated RB sets, if any. Otherwise, the UE shall determine the resource allocation in frequency domain as an intersection of the resource blocks of the indicated interlaces and the resource blocks the indicated set of RB sets.

Example 2: For DCI 0_0 monitored in a UE-specific search space and DCI 0_1, if the UE indicates the capability of transmitting in intra-cell guard band, the UE shall determine the resource allocation in frequency domain as an intersection of the resource blocks of the active UL BWP, the resource blocks of the indicated interlaces, and the resource blocks of the indicated set of RB sets and intra-cell guard bands defined in Clause 7 between the indicated RB sets, if any. Otherwise, the UE shall determine the resource allocation in frequency domain as an intersection of the resource blocks of the active UL BWP, the resource blocks of the indicated interlaces, and the resource blocks of the indicated set of RB sets.

Furthermore, in another method of the uplink transmission method of the embodiment of the sixth aspect of this disclosure, if the terminal equipment is unable to transmit uplink transmission at an intra-cell guard band, the terminal equipment does not expect that the indication information indicates the above two or more RB sets; or, if the terminal equipment does not indicate that the terminal equipment is able to transmit uplink transmission at an intra-cell guard band, the terminal equipment does not expect that the indication information indicates the above two or more RB sets.

That the terminal equipment does not expect that the indication information indicates the above two or more RB sets refers to that the terminal equipment does not process the indication information.

According to the embodiment of the sixth aspect, the resources for transmitting the uplink transmission may be determined based on the capability of the terminal equipment, thereby improving reliability and efficiency of data transmission.

Embodiment of a Seventh Aspect

The embodiment of the seventh aspect of this disclosure provides an uplink transmission reception method, which is applicable to a network device and corresponds to the embodiment of the sixth aspect.

Figure 17:
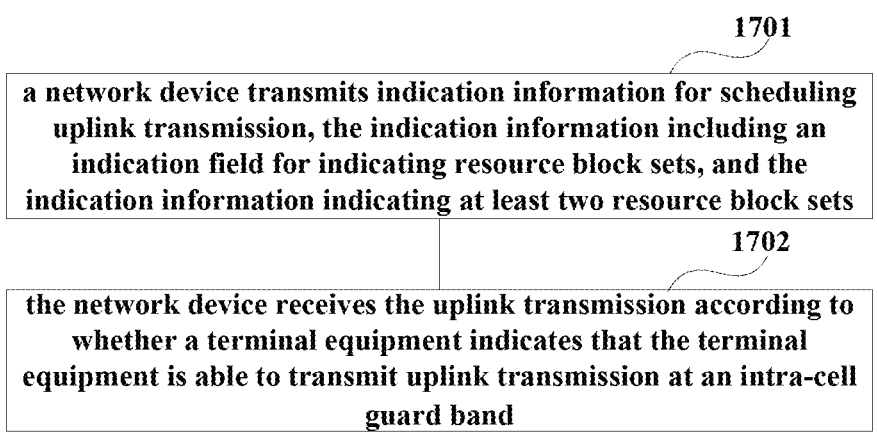
FIG. 17 is a schematic diagram of an uplink transmission reception method of an embodiment of this disclosure.

FIG. 17 is a schematic diagram of the uplink transmission reception method of the embodiment of the seventh aspect. As shown in FIG. 17, the method includes:

1701: a network device transmits indication information for scheduling uplink transmission, the indication information including an indication field for indicating resource block sets (RB sets), and the indication information indicating at least two resource block sets (RB sets); and

1702: the network device receives the uplink transmission according to whether a terminal equipment indicates that the terminal equipment is able to transmit uplink transmission at an intra-cell guard band.

In operation 1701, the indication information is able to indicate resources used by the terminal equipment to transmit the uplink transmission (e.g. a PUSCH). Wherein, the PUSCH may be semi-statically/semi-persistently/dynamically scheduled, and the indication information may be DCI 0_0 (in USS), DCI 0_1 or DCI 0_2, or RRC signaling for configuring a CG PUSCH of Type 1 or Type 2. At least two resource block sets (RB sets) indicated by the indication information are consecutive.

In operation 1702, the network device receives the uplink transmission, wherein the network device may receive the uplink transmission according to whether the terminal equipment has a predetermined capability or whether it is indicated that the terminal equipment has a predetermined capability. The predetermined capability includes: a capability of the terminal equipment to transmit uplink transmission at an intra-cell guard band.

For example, in a case where the terminal equipment indicates that it is able to transmit uplink transmission at an intra-cell guard band, the network device receives the uplink transmission on the following resources: the at least two resource block sets and an intersection of a resource block in an intra-cell guard band between the at least two resource block sets and the interlaced resource blocks indicated by the indication information.

For another example, in a case where the terminal equipment is able to transmit uplink transmission at an intra-cell guard band and indicates that it is able to transmit uplink transmission at an intra-cell guard band, the network device receives the uplink transmission on the following resources: the at least two resource block sets and an intersection of a resource block in an intra-cell guard band between the at least two resource block sets and the interlaced resource blocks indicated by the indication information.

For a further example, in a case where the terminal equipment does not indicate that it is able transmit the uplink transmission at an intra-cell guard band, the network device receives the uplink transmission in the following resource: an intersection of the interlaced resource blocks indicated by the indication information and a resource block in the at least two resource block sets.

The case where the terminal equipment does not indicate that it is able to transmit uplink transmission at an intra-cell guard band refers to a case where the terminal equipment is able to transmit uplink transmission at the intra-cell guard band, but it does not indicate that it is able to transmit uplink transmission at the intra-cell guard band; or, the terminal equipment is unable to transmit uplink transmission at the intra-cell guard band and does not indicate that it is able to transmit uplink transmission at the intra-cell guard band.

Furthermore, in operation 1702, the network device may determine the resources for receiving the uplink transmission according to whether the terminal equipment has the above predetermined capability or whether the terminal equipment indicates that it has the predetermined capability, and receive the uplink transmission on the determined resources. However, the operation of determining the resources is not necessary, and operation 1702 may have no operation of determining the resources.

According to the embodiment of the seventh aspect, the resources for transmitting the uplink transmission may be determined based on the capability of the terminal equipment, thereby improving reliability and efficiency of data transmission.

Embodiment of an Eighth Aspect

In some cases, a UL BWP may possibly include only a part of RBs (not all RBs) of an RB set.

Figure 18A:
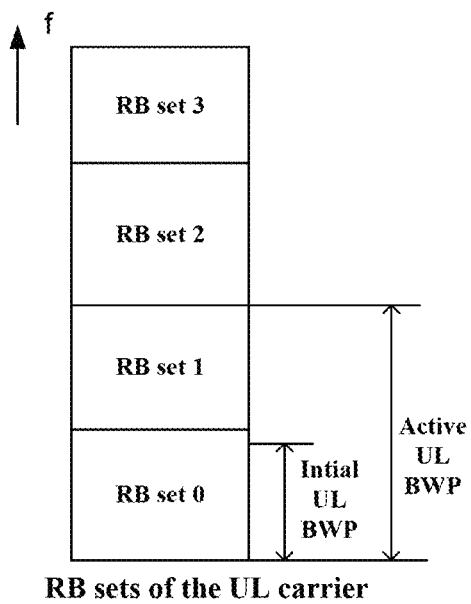
FIG. 18A is a schematic diagram of a UL BWP including a part of RBs of an RB set.

FIG. 18A is a schematic diagram of a UL BWP including a part of RBs of an RB set. As shown in FIG. 18A, an active UL BWP includes multiple complete RB sets, and a UL BWP includes a part of RBs of an RB set.

Figure 18B:
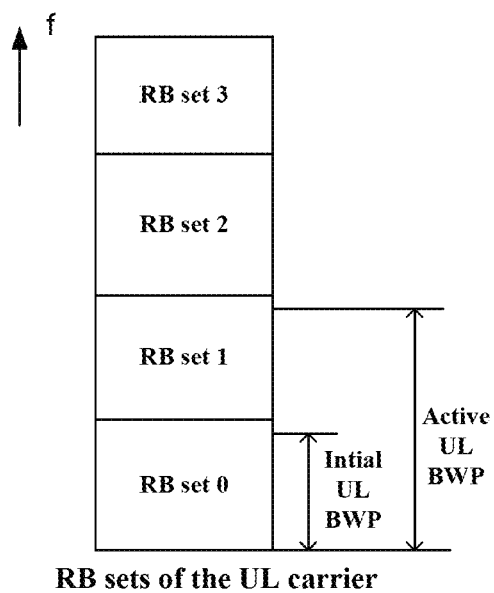
FIG. 18B is a schematic diagram of a UL BWP including a part of RBs of an RB set.

FIG. 18B is another schematic diagram of a UL BWP including a part of RBs of an RB set. As shown in FIG. 18B, an active UL BWP includes a part of RBs of an RB set, and a UL BWP also includes a part of RBs of an RB set. In FIG. 18B, a UL carrier is not configured with an intra-cell guard band.

Figure 18C:
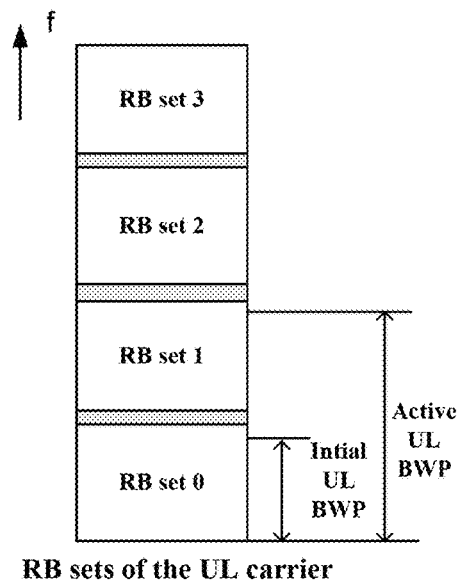
FIG. 18C is a schematic diagram of a UL BWP including a part of RBs of an RB set.

FIG. 18C is a further schematic diagram of a UL BWP including a part of RBs of an RB set. In FIG. 18C, an active UL BWP includes a part of RBs of an RB set, and a UL BWP also includes a part of RBs of an RB set. In FIG. 18C, a UL carrier is configured with an intra-cell guard band.

According to FIGS. 18A, 18B and 18C, for RB sets of the same per carrier, RBs in the RB sets of the per carrier actually included in different UL BWPs may be different.

In this case, considering CBRA, if the terminal equipment UE determines the resources for transmitting the PUSCH based on an RB set included in the active UL BWP (in view of per BWP, RBs in the RB set are less than or equal to RBs of an RB set of corresponding per carrier) after receiving a random access response (RAR) or using downlink control information scrambled by a TC-RNTI and having downlink control information format 0_0, the network device may possibly be unable to uniquely determine the resources for receiving the PUSCH.

Figure 18D:
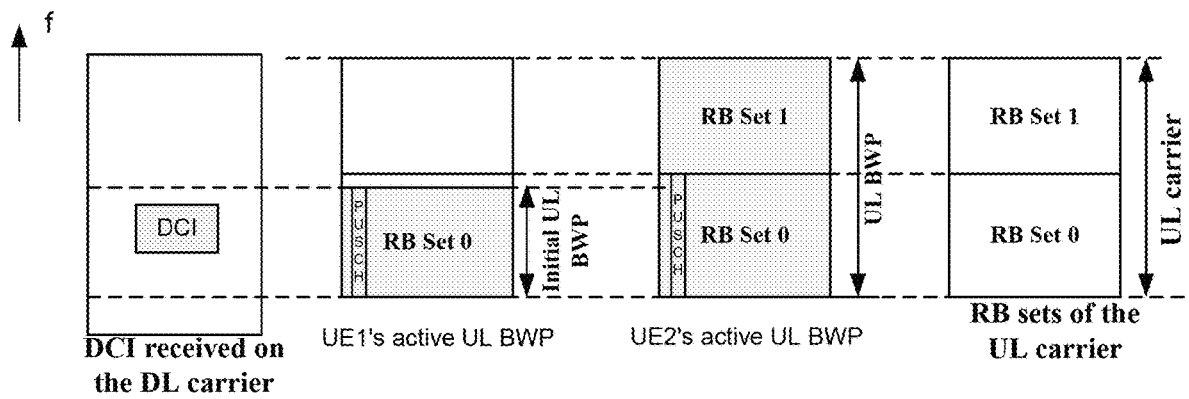
FIG. 18D is a schematic diagram of determining resources for transmitting a PUSCH by the terminal equipment based on an RB set included in an active UL BWP after receiving downlink control information.
Figure 18E:
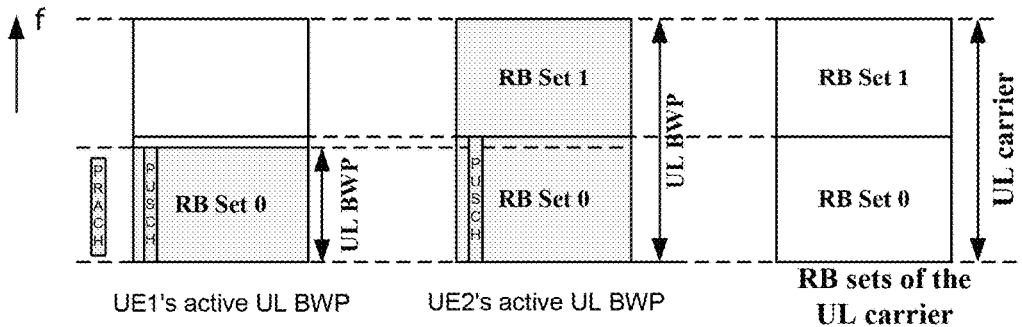
FIG. 18E is a schematic diagram of determining resources for transmitting a PUSCH by the terminal equipment based on an RB set included in an active UL BWP after receiving a random access response.

FIG. 18D is a schematic diagram of determining resources for transmitting a PUSCH by the terminal equipment based on an RB set included in an active UL BWP after receiving downlink control information, and FIG. 18E is a schematic diagram of determining resources for transmitting a PUSCH by the terminal equipment based on an RB set included in an active UL BWP after receiving a random access response.

As shown in FIG. 18D and FIG. 18E, resources determined by UE1 and UE2 for transmitting the PUSCH are different. However, in CBRA, the network device does not learn which UE transmits the PUSCH, hence, it is unable to uniquely determine which part of the resources receives the PUSCH.

In addition, FIG. 18D and FIG. 18E show a case where the UL carrier is not configured with an intra-cell guard band, and a case where the UL carrier is configured with an intra-cell guard band is similar thereto.

The embodiment of this disclosure provides an uplink transmission method.

1) In some embodiments, when the active UL BWP includes a part of RBs of an RB set per carrier, the UE determines that a resource block for transmitting the uplink transmission is: an intersection of a PRACH-mapped resource block used by the UE for transmitting a preamble before receiving the indication information and interlaced resource blocks indicated by the indication information.

Figure 18F:
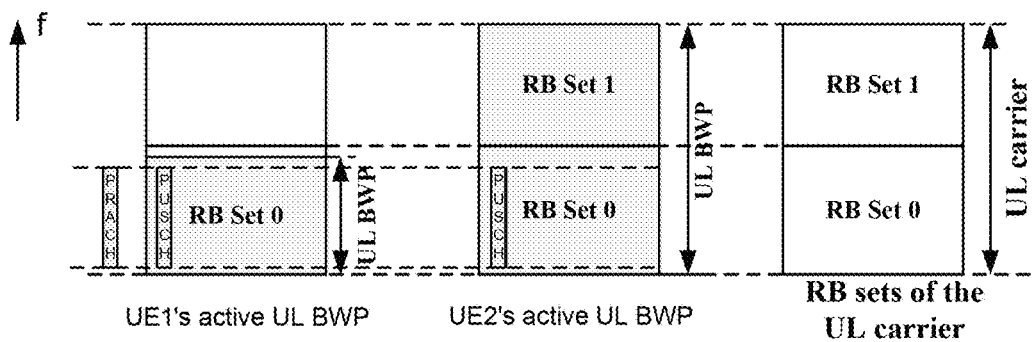
FIG. 18F is a schematic diagram of the uplink transmission method of an embodiment of this disclosure.

FIG. 18F is a schematic diagram of the uplink transmission method of the embodiment of this disclosure. As shown in FIG. 18F, using the above method 1), the resources determined by UE1 and UE2 are identical. Even if the network device does not learn which UE transmits the PUSCH, it is able to uniquely determine the part of resources on which the PUSCH is received, and hence successfully receives the PUSCH and schedules other UEs appropriately.

2) In some embodiments, in a case where the active UL BWP includes a part of RBs of the RB set per carrier, if the active UL BWP and an initial UL BWP completely overlap, the UE determines that the resource block for transmitting the uplink transmission is: an intersection of resource blocks in the initial UL BWP and the interlaced resource blocks indicated by the indication information.

3) In some embodiments, in the case where the active UL BWP includes a part of RBs of the RB set per carrier, if the active UL BWP and the initial UL BWP do not completely overlap, the UE determines that the resource block for transmitting the uplink transmission is: an intersection of a PRACH-mapped resource block used by the UE for transmitting a preamble before receiving the indication information and the interlaced resource blocks indicated by the indication information.

Figure 18G:
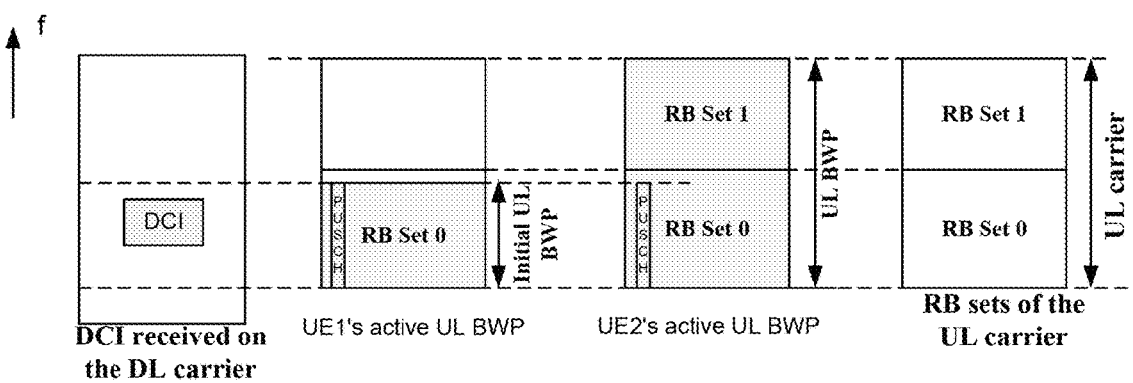
FIG. 18G is a schematic diagram of the uplink transmission method of an embodiment of this disclosure.

FIG. 18G is another schematic diagram of the uplink transmission method of the embodiment of this disclosure. As shown in FIG. 18G, using the above method 3), the resources determined by UE1 and UE2 are identical. Even if a base station does not learn which UE transmits the PUSCH, it is able to uniquely determine the part of resources on which the PUSCH is received, and hence successfully receives the PUSCH and schedules other UEs appropriately.

The above indication information is a random access response (RAR), or downlink control information having downlink control information format 0_0 and scrambled by a TC-RNTI.

Embodiment of a Ninth Aspect

The embodiment of this disclosure provides an uplink transmission apparatus. The apparatus may be, for example, a terminal equipment, or may be one or more components or assemblies configured in a terminal equipment. Contents in this embodiment identical to those in the embodiments of the first to the sixth aspects and the eighth aspect shall not be described herein any further.

Figure 19:
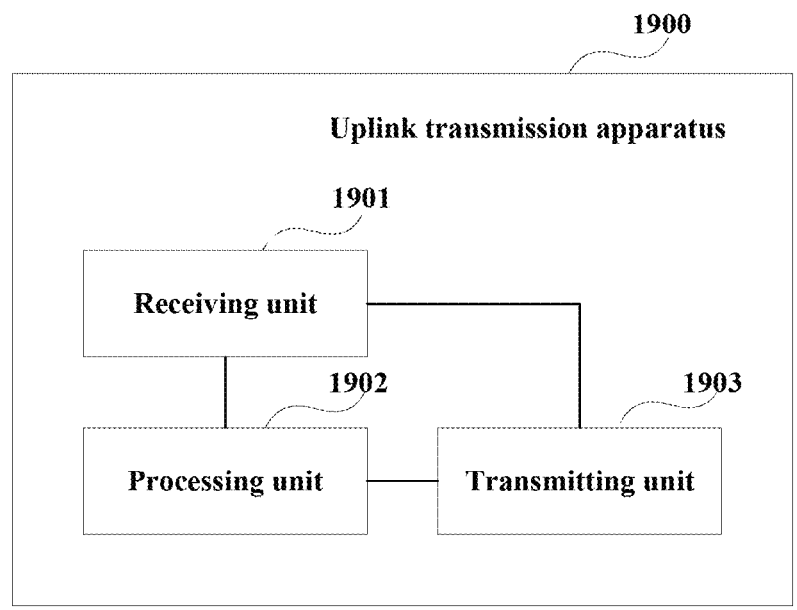
FIG. 19 is a schematic diagram of the uplink transmission apparatus of an embodiment of this disclosure.

FIG. 19 is a schematic diagram of the uplink transmission apparatus of the embodiment of this disclosure. As shown in FIG. 19, an uplink transmission apparatus 1900 includes:
- a receiving unit 1901 configured to receive configuration information of an uplink bandwidth part, the configuration information of the uplink bandwidth part indicating that the uplink bandwidth part includes at least two resource block sets; and
- a processing unit 1902 configured not to monitor or receive first indication information used for scheduling uplink transmission and not including an indication field for indicating a resource block set on a downlink bandwidth part to which the uplink bandwidth part corresponds.

In some embodiments, the uplink bandwidth part and the corresponding downlink bandwidth part have identical identifiers, and the first indication information includes: downlink control information having a downlink control information format 0_0, or downlink control information having a downlink control information format 0_2, or a random access response (RAR) in a random access procedure.

In some embodiments, the terminal equipment does not expect to configure or determine not to configure to monitor or receive the first indication information on the downlink bandwidth part to which the uplink bandwidth part corresponds.

In some embodiments, the processing unit 1902 is further configured to:
on the downlink bandwidth part to which the uplink bandwidth part corresponds, not to monitor or receive second indication information for scheduling downlink transmission. The second indication information includes: downlink control information having a downlink control information format 1_0.

In some embodiments, the processing unit 1902 is further configured to: not to transmit a physical random access channel of contention-based random access on the uplink bandwidth part; or not to transmit a physical random access channel other than those for beam failure recovery on the uplink bandwidth part; or not to transmit a physical random access channel on the uplink bandwidth part.

In some embodiments, the uplink bandwidth part configuration information does not include information for indicating physical random access channel configuration of contention-based random access; or, the uplink bandwidth part configuration information does not include information for indicating physical random access channel configuration other than those for beam failure recovery; or, the uplink bandwidth part configuration information does not include information for indicating physical random access channel configuration.

In some embodiments, the receiving unit 1901 is further configured to: receive configuration information of the downlink bandwidth part, and the configuration information of the downlink bandwidth part does not include configuration information instructing the terminal equipment to monitor or receive the first indication information, and/or, does not include configuration information instructing the terminal equipment to monitor or receive second indication information.

In some embodiments, as shown in FIG. 19, the uplink transmission apparatus 1900 further includes a transmitting unit 1903. The receiving unit 1901 is further configured to: receive indication information not eluding an indication field for indicating a resource block set, the indication information scheduling uplink transmission on an uplink bandwidth part including at least two resource block sets, and the transmitting unit 1903 transmits the uplink transmission on at least one predefined or preconfigured resource block set.

In some embodiments, the indication information includes: downlink control information having downlink control information format 0_0; wherein the downlink control information is scrambled by a C-RNTI or a CS-RNTI or an MCS-C-RNTI or a TC-RNTI; or, the indication information includes: a random access response in a random access procedure.

In some embodiments, the at least one resource block set is predefined, and the predefined resource block set includes at least one of the following:
an uplink resource block set, in the at least two resource block sets, linked with a downlink resource block set where a frequency-domain resource for transmitting the indication information is located;
an uplink resource block set, in the at least two resource block sets, corresponding to the frequency-domain resource for transmitting the indication information;
a resource block set, in the at least two resource block sets, having a smallest resource block set index value;
a resource block set, in the at least two resource block sets, having a lowest frequency-domain position;
a resource block set, in the at least two resource block sets, having a highest frequency-domain position;
a resource block set, in the at least two resource block sets, overlapping with an initial uplink bandwidth part;
a resource block set, in the at least two resource block sets, overlapping with some or all of resource block sets included in an initial uplink bandwidth part;
a part or all of resource block sets in the at least two resource block sets; and
a resource block set, in the at least two resource block sets, used for transmitting a random access preamble sequence to which the uplink transmission corresponds.

In some embodiments, the at least one resource block set is configured by higher-layer signaling, the higher-layer signaling configuring a linking relationship between an uplink resource block set and a downlink resource block set, or the higher-layer signaling configuring the uplink resource block set scheduled by the indication information.

In some embodiments, the receiving unit 1901 receives indication information used for scheduling the terminal equipment to transmit uplink transmission, and the processing unit 1902 determines a frequency-domain resource allocation bit number according to a subcarrier spacing of an active uplink bandwidth part when the indication information is received and/or the number of resource block sets included in the active uplink bandwidth part, or, determines an FRDA bit number according to a carrier where the uplink transmission is located or the subcarrier spacing of the active uplink bandwidth part and/or the number of resource block sets included in the carrier where the uplink transmission is located, or, determines a frequency-domain resource allocation (FRDA) bit number according to a subcarrier spacing (SCS) of a specific active uplink bandwidth part in at least one configured uplink bandwidth part and/or the number of resource block sets included in the active uplink bandwidth part.

In some embodiments, in a case where the terminal equipment is configured to transmit the uplink transmission by using interlaced frequency-domain resources, the indication information does not include an indication field for indicating a bandwidth part; or, the indication information includes an indication field for indicating a bandwidth part and the terminal equipment ignores the indication field for indicating the bandwidth part included in the indication information.

In some embodiments, the indication information includes an indication field for indicating a bandwidth part, and the indication field indicates a second uplink bandwidth part different from the active uplink bandwidth part, i.e. the first uplink bandwidth part.

In some embodiments, in the case where the terminal equipment is configured to transmit the uplink transmission by using the interlaced frequency-domain resources, the terminal equipment expects or determines that the subcarrier spacing of the first uplink bandwidth part and the subcarrier spacing of the second uplink bandwidth part are identical.

In some embodiments, the terminal equipment further expects or determines that the number of resource block sets on the first uplink bandwidth part and the number of resource block sets on the second uplink bandwidth part are identical.

In some embodiments, the terminal equipment ignores the indication field used for indicating resource block sets in the indication information.

In some embodiments, the processing unit 1902 is further configured to: determine frequency-domain resources on the second uplink bandwidth part for transmitting the uplink transmission according to the subcarrier spacings of the first uplink bandwidth part and the second uplink bandwidth part and/or the number of resource blocks included therein.

In some embodiments, the receiving unit 1901 receives first configuration information for indicating a guard band and/or a resource block set of an uplink carrier, and the processing unit 1902 determines resource blocks included in the resource block set on the uplink carrier according to a frequency-domain position of a starting resource block and/or a frequency-domain position of an ending resource block of the guard band.

In some embodiments, the processing unit 1902 is further configured to: in a case where the first configuration information indicates that there exists no guard band, determine that the resource blocks included in the resource block set of the uplink carrier are predefined.

In some embodiments, the first configuration information includes information for indicating a frequency domain position of a starting resource block of the guard band and/or a frequency-domain position of an ending resource block of the guard band, wherein the frequency-domain position of the starting resource block of the guard band indicated by the information is higher than or equal to the frequency-domain position of the ending resource block of the guard band.

In some embodiments, a starting common resource block index is equal to an ending common resource block index plus one.

In some embodiments, the receiving unit 1901 is further configured to: receive second configuration information for indicating the resource block sets of the uplink carrier.

In some embodiments, the receiving unit 1901 is further configured to: receive third configuration information of the UL BWP of the uplink carrier; if the first configuration information indicates that there exists no guard band, the third configuration information does not include information instructing the terminal equipment to transmit the uplink transmission by using interlaced frequency-domain resources; or, if the third configuration information includes the information instructing the terminal equipment to transmit the uplink transmission by using interlaced frequency-domain resources, the first configuration information does not indicate that there exists no guard band.

In some embodiments, the receiving unit 1901 receives indication information indicating resources of the terminal equipment for transmitting uplink transmission, and in a case where a downlink carrier is configured as having no guard band, the transmitting unit 1902 takes a predetermined number of resource blocks in a downlink bandwidth part (DL BWP) as a predefined or preconfigured resource block set, and transmits the uplink transmission on the predefined or preconfigured resource block set.

In some embodiments, the receiving unit 1901 receives indication information used for scheduling uplink transmission, the indication information including an indication field used for indicating resource block sets (RB sets), and the indication information indicating at least two resource block sets (RB sets), and the transmitting unit 1902 determines resource blocks used for transmitting the uplink transmission according to the indication information, and transmits the uplink transmission on the determined resource blocks.

For example, in a case where the terminal equipment indicates that it is able to transmit uplink transmission at an intra-cell guard band, the transmitting unit determines that the resource blocks used for transmitting the uplink transmission are: the at least two resource block sets and an intersection of a resource block in an intra-cell guard band between the at least two resource block sets and the interlaced resource blocks indicated by the indication information. For another example, in a case where the terminal equipment does not indicate that it is able to transmit uplink transmission at an intra-cell guard band, the transmitting unit determines that the resource blocks used for transmitting the uplink transmission are: an intersection of the interlaced resource blocks indicated by the indication information and a resource block in the at least two resource block sets.

It should be noted that the components or modules related to this disclosure are only described above. However, this disclosure is not limited thereto, and the uplink transmission apparatus 900 may further include other components or modules, and reference may be made to related techniques for particulars of these components or modules.

Furthermore, for the sake of simplicity, connection relationships between the components or modules or signal profiles thereof are only illustrated in FIG. 19. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the terminal equipment may be supported to determine the resource used for uplink transmission, so that the uplink transmission may be transmitted and received correctly.

Embodiment of a Tenth Aspect

The embodiment of this disclosure provides a communication system, and reference may be made to FIG. 1, with contents identical to those in the embodiments of the first to the ninth aspects being not going to be described herein any further.

In some embodiments, the communication system 100 may include:
a terminal equipment 102 including the uplink transmission apparatus 1900 described in the embodiment of the ninth aspect.

The embodiment of this disclosure further provides a network device, which may be, for example, a base station. However, this disclosure is not limited thereto, and it may also be another network device.

Figure 20:
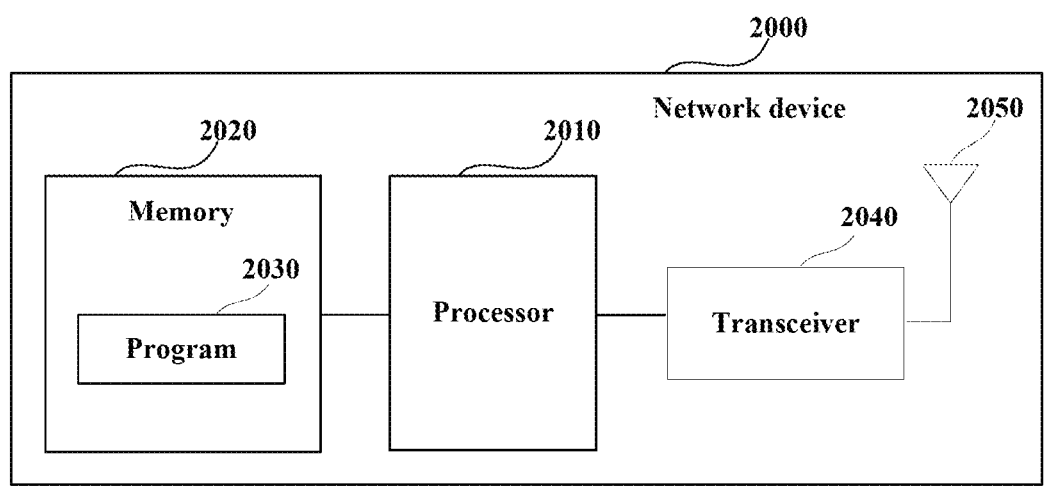
FIG. 20 is a schematic diagram of the network device of an embodiment of this disclosure.

FIG. 20 is a schematic diagram of a structure of the network device of the embodiment of this disclosure. As shown in FIG. 20, a network device 2000 may include a processor 2010 (such as a central processing unit (CPU)) and a memory 2020, the memory 2020 being coupled to the processor 2010. Wherein, the memory 2020 may store various data, and furthermore, it may store a program 2030 for data processing, and execute the program 2030 under control of the processor 2010.

For example, the processor 2010 may be configured to execute the program to carry out the uplink transmission method as described in the embodiments of the first to sixth aspects. For example, the processor 2010 may be configured to execute the following control: transmitting configuration information and/or indication information to a terminal equipment. And furthermore, the processor 2010 may be configured to execute the program to carry out the uplink transmission reception method as described in the embodiment of the seventh aspect.

Furthermore, the network device 2000 may include an uplink transmission reception apparatus, the uplink transmission reception apparatus including a first transmitting unit and a first receiving unit. The first transmitting unit transmits indication information for scheduling uplink transmission, the indication information including an indication field for indicating resource block sets (RB sets), and the indication information indicating at least two resource block sets (RB sets), and the first receiving unit receives the uplink transmission according to whether a terminal equipment indicates that the terminal equipment is able to transmit uplink transmission at an intra-cell guard band.

Furthermore, as shown in FIG. 20, the network device 2000 may include a transceiver 2040, and an antenna 2050, etc. Wherein, functions of the above components are similar to those in the related art, and shall not be described herein any further. It should be noted that the network device 2000 does not necessarily include all the parts shown in FIG. 20, and furthermore, the network device 2000 may include parts not shown in FIG. 20, and the related art may be referred to.

The embodiment of this disclosure further provides a terminal equipment; however, this disclosure is not limited thereto, and it may also be another equipment.

Figure 21:
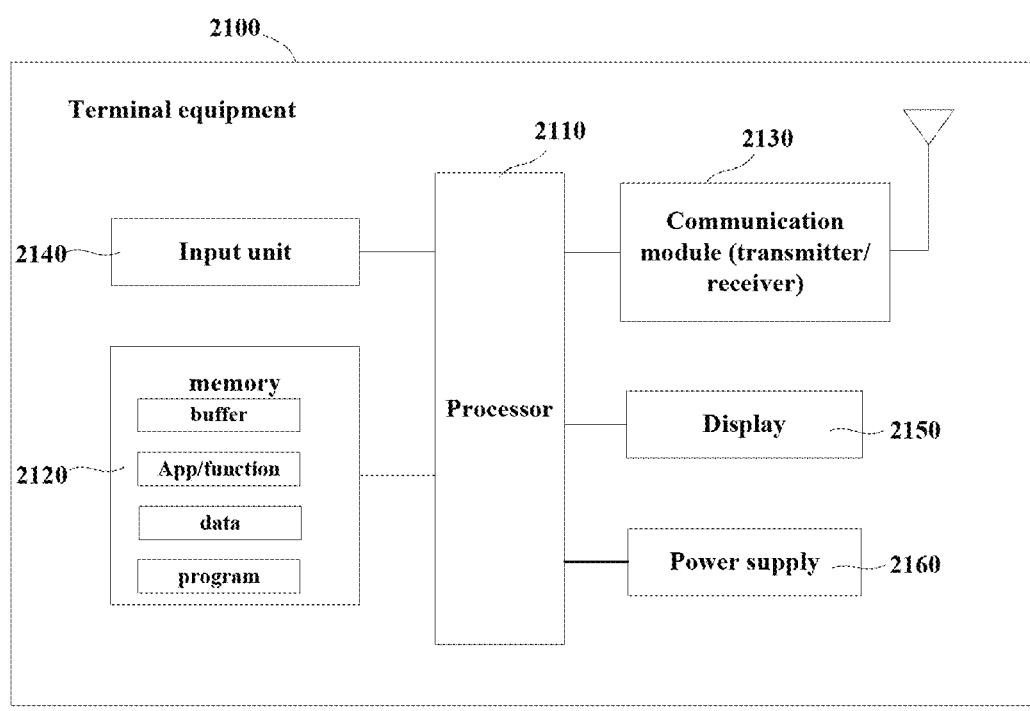
FIG. 21 is a schematic diagram of the terminal equipment of an embodiment of this disclosure.

FIG. 21 is a schematic diagram of the terminal equipment of the embodiment of this disclosure. As shown in FIG. 21, a terminal equipment 2100 may include a processor 2110 and a memory 2120, the memory 2120 storing data and a program and being coupled to the processor 2110. It should be noted that this figure is illustrative only, and other types of structures may also be used, so as to supplement or replace this structure and achieve a telecommunications function or other functions.

For example, the processor 2110 may be configured to execute a program to carry out the uplink transmission method as described in the embodiment of the first aspect. For example, the processor 2110 may be configured to perform the following control: receiving configuration information of an uplink bandwidth part (UL BWP), the configuration information of the uplink bandwidth part (UL BWP) indicating that the uplink bandwidth part includes at least two resource block sets (RB sets); and not monitoring or receiving first indication information used for scheduling uplink transmission and not including an indication field for indicating a resource block set on a downlink bandwidth part (DL BWP) to which the uplink bandwidth part corresponds.

For example, the processor 2110 may be configured to execute a program to carry out the uplink transmission method as described in the embodiment of the second aspect. For example, the processor 2110 may be configured to perform the following control: receiving indication information not including an indication field for indicating a resource block set, the indication information scheduling uplink transmission on an uplink bandwidth part including at least two resource block sets; and transmitting the uplink transmission on at least one predefined or preconfigured resource block set.

Or, the processor 2110 may be configured to perform the following control: receiving indication information used for scheduling the terminal equipment to transmit uplink transmission, the indication information including an indication field for indicating resource block sets, and the indication information being downlink control information having downlink control information format 0_0, or downlink control information having downlink control information format 0_2, or a random access response (RAR); and transmitting the uplink transmission on at least one resource block set indicated by the indication field.

For another example, the processor 2110 may be configured to execute a program to carry out the uplink transmission method as described in the embodiment of the third aspect. For example, the processor 2110 may be configured to perform the following control: receiving indication information used for scheduling the terminal equipment to transmit uplink transmission; and determining a frequency-domain resource allocation bit number according to a subcarrier spacing of an active uplink bandwidth part when the indication information is received and/or the number of resource block sets included in the active uplink bandwidth part, or, determining a frequency-domain resource allocation (FRDA) bit number according to a carrier where the uplink transmission is located or the subcarrier spacing (SCS) of the active uplink bandwidth part and/or the number of resource block sets included in the carrier where the uplink transmission is located, or, determining a frequency-domain resource allocation (FRDA) bit number according to a subcarrier spacing (SCS) of a specific active uplink bandwidth part in at least one configured uplink bandwidth part and/or the number of resource block sets included in the active uplink bandwidth part.

For a further example, the processor 2110 may be configured to execute a program to carry out the uplink transmission method as described in the embodiment of the fourth aspect. For example, the processor 2110 may be configured to perform the following control: receiving first configuration information for indicating a guard band and/or a resource block set (RB set) of an uplink carrier; and determining resource blocks included in the resource block set on the uplink carrier according to a frequency-domain position of a starting resource block and/or a frequency-domain position of an ending resource block of the guard band.

Or, the processor 2110 may be configured to perform the following control: receiving indication information for scheduling the terminal equipment to transmit uplink transmission, the indication information excluding an indication field for indicating resource block sets.

For still another example, the processor 2110 may be configured to execute a program to carry out the uplink transmission method as described in the embodiment of the fifth aspect. For example, the processor 2110 may be configured to perform the following control: receiving indication information indicating a resource used by the terminal equipment in transmitting uplink transmission; and in a case where a downlink carrier is configured as having no guard band, taking a predetermined number of resource blocks in a downlink bandwidth part (DL BWP) as a predefined or preconfigured resource block set, and transmitting the uplink transmission on the predefined or preconfigured resource block set.

For still another example, the processor 2110 may be configured to execute a program to carry out the uplink transmission method as described in the embodiment of the sixth aspect. For example, the processor 2110 may be configured to perform the following control: receiving indication information used for scheduling uplink transmission, the indication information including an indication field used for indicating resource block sets (RB sets), and the indication information indicating at least two resource block sets (RB sets); and determining resource blocks used for transmitting the uplink transmission according to the indication information, and transmitting the uplink transmission on the determined resource blocks.

As shown in FIG. 21, the terminal equipment 2100 may further include a communication module 2130, an input unit 2140, a display 2150, and a power supply 2160; wherein functions of the above components are similar to those in the related art, which shall not be described herein any further. It should be noted that the terminal equipment 2100 does not necessarily include all the parts shown in FIG. 21, and the above components are not necessary. Furthermore, the terminal equipment 2100 may include parts not shown in FIG. 21, and the related art may be referred to.

An embodiment of this disclosure provides a computer readable program, which, when executed in a terminal equipment, will cause the terminal equipment to carry out the uplink transmission method as described in the embodiments of the first to the fourth aspects.

An embodiment of this disclosure provides a computer storage medium, including a computer readable program, which, when executed in a terminal equipment, will cause the terminal equipment to carry out the uplink transmission method as described in the embodiments of the first to the fourth aspects The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention. As to implementations containing the above embodiments, following supplements are further disclosed.

Supplement 1. An uplink transmission method, including:
receiving configuration information of an uplink bandwidth part (UL BWP) by a terminal equipment, the configuration information of the uplink bandwidth part (UL BWP) indicating that the uplink bandwidth part includes at least two resource block sets (RB sets); and
not monitoring or receiving first indication information used for scheduling uplink transmission and not including an indication field for indicating a resource block set by the terminal equipment on a downlink bandwidth part (DL BWP) to which the uplink bandwidth part corresponds.

Supplement 2. The method according to supplement 1, wherein the uplink bandwidth part and the corresponding downlink bandwidth part have identical identifiers (IDs).

Supplement 3. The method according to supplement 1 or 2, wherein the first indication information includes: downlink control information having downlink control information format 0_0, or downlink control information having downlink control information format 0_2, or a random access response (RAR) in a random access procedure.

Supplement 4. The method according to any one of supplements 1-3, wherein the method further includes:
not expecting to be configured or determining not to be configured by the terminal equipment to monitor or receive the first indication information on the downlink bandwidth part corresponding to the uplink bandwidth part.

Supplement 5. The method according to any one of supplements 1-4, wherein the method further includes:
not monitoring or receiving second indication information for scheduling downlink transmission by the terminal equipment on the downlink bandwidth part corresponding to the uplink bandwidth part.

Supplement 6. The method according to supplement 5, wherein the second indication information includes: downlink control information having a downlink control information format 1_0.

Supplement 7. The method according to any one of supplements 1-6, wherein the method further includes:
not transmitting a physical random access channel (PRACH) of contention-based random access (CBRA) on the uplink bandwidth part by the terminal equipment;

or, not transmitting a physical random access channel (PRACH) other than those for beam failure recovery (BFR) based on CFRA on the uplink bandwidth part by the terminal equipment;

or, not transmitting a physical random access channel (PRACH) on the uplink bandwidth part by the terminal equipment.

Supplement 8. The method according to supplement 7, wherein the uplink bandwidth part configuration information does not include information for indicating physical random access channel configuration of contention-based random access (CBRA);

or, the uplink bandwidth part configuration information does not include information for indicating physical random access channel configuration other than those for beam failure recovery;

or, the uplink bandwidth part configuration information does not include information for indicating physical random access channel configuration.

Supplement 9. The method according to any one of supplements 1-8, wherein the method further includes:

receiving configuration information of the downlink bandwidth part (DL BWP) by the terminal equipment, the configuration information of the downlink bandwidth part not including configuration information instructing the terminal equipment to monitor or receive the first indication information, and/or, not including configuration information instructing the terminal equipment to monitor or receive second indication information.

Supplement 10. An uplink transmission method, including:

receiving indication information not including an indication field for indicating a resource block set by a terminal equipment, the indication information scheduling uplink transmission on an uplink bandwidth part (UL BWP) including at least two resource block sets (RB sets); and transmitting the uplink transmission on at least one predefined or preconfigured resource block set.

Supplement 11. The method according to supplement 10, wherein the indication information includes: downlink control information having downlink control information format 0_0.

Supplement 12. The method according to supplement 11, wherein the downlink control information is scrambled by a C-RNTI or a CS-RNTI or an MCS-C-RNTI or a TC-RNTI.

Supplement 13. The method according to any one of supplements 10-12, wherein the at least one resource block set is predefined, and the predefined resource block set includes at least one of the following:

an uplink resource block set, in the at least two resource block sets, linked with a downlink resource block set where a frequency-domain resource for transmitting the indication information is located;

an uplink resource block set, in the at least two resource block sets, corresponding to the frequency-domain resource for transmitting the indication information;

a resource block set, in the at least two resource block sets, having a smallest resource block set index value;

a resource block set, in the at least two resource block sets, having a lowest frequency-domain position;

a resource block set, in the at least two resource block sets, having a highest frequency-domain position;

a resource block set, in the at least two resource block sets, overlapping with an initial uplink bandwidth part;

a resource block set, in the at least two resource block sets, overlapping with some or all of resource block sets included in an initial uplink bandwidth part; and a part or all of resource block sets in the at least two resource block sets.

Supplement 14. The method according to any one of supplements 10-12, wherein the at least one resource block set is configured or indicated by higher-layer signaling, the higher-layer signaling configuring a linking relationship between an uplink resource block set and a downlink resource block set, or the higher-layer signaling configuring the uplink resource block sets scheduled by the indication information.

Supplement 15. The method according to supplement 10, wherein the indication information includes: a random access response (RAR) in a random access procedure, or downlink control information scrambled by a TC-RNTI and having downlink control information format 0_0.

Supplement 16. The method according to supplement 15, wherein the at least one resource block set is predefined, and the predefined resource block set includes at least one of the following:

an uplink resource block set, in the at least two resource block sets, with which the downlink resource block set where the frequency-domain resource for transmitting the indication information is located is linked;

an uplink resource block set, in the at least two resource block sets, corresponding to the frequency-domain resource for transmitting the indication information;

a resource block set, in the at least two resource block sets, overlapping with an initial uplink bandwidth part;

a resource block set, in the at least two resource block sets, overlapping with a part or all of resource block sets included in the initial uplink bandwidth part;

a part or all of resource block sets in the at least two resource block sets; and a resource block set, in the at least two resource block sets, for transmitting a random access preamble sequence to which the uplink transmission corresponds.

Supplement 17. The method according to supplement 15, wherein the at least one resource block set is configured or indicated by higher-layer signaling, the higher-layer signaling configuring a linking relationship between an uplink resource block set and a downlink resource block set, or the higher-layer signaling configuring the uplink resource block set scheduled by the indication information.

Supplement 18. An uplink transmission method, including:

receiving, by a terminal equipment, indication information used to schedule the terminal equipment to transmit uplink transmission, the indication information including an indication field used to indicate resource block sets, and the indication information being downlink control information having downlink control information format 0_0, or, downlink control information having downlink control information format 0_2, or a random access response (RAR); and transmitting the uplink transmission by the terminal equipment on at least one resource block set indicated by the indication field.

Supplement 19. An uplink transmission method, including:

receiving, by a terminal equipment, indication information for scheduling the terminal equipment to transmit uplink transmission; and determining a frequency-domain resource allocation (FRDA) bit number according to a subcarrier spacing (SCS) of an active uplink bandwidth part when the indication information is received and/or the number of resource block sets included in the active uplink bandwidth part, or, determining a frequency-domain resource allocation bit number according to a carrier where the uplink transmission is located or the subcarrier spacing of the active uplink bandwidth part and/or the number of resource block sets included in the carrier where the uplink transmission is located, or, determining a frequency-domain resource allocation (FRDA) bit number according to a subcarrier spacing (SCS) of a specific active uplink bandwidth part in at least one configured uplink bandwidth part and/or the number of resource block sets included in the active uplink bandwidth part.

Supplement 20. The method according to supplement 19, wherein the indication information includes: downlink control information having downlink control information format 0_1, downlink control information having downlink control information format 0_2, downlink control information having downlink control information format 0_0, or a random access response (RAR) in a random access procedure.

Supplement 21. The method according to supplement 19, wherein,
in a case where the terminal equipment is configured to transmit the uplink transmission by using interlaced frequency-domain resources, the indication information does not include an indication field for indicating a bandwidth part; or, the indication information includes an indication field for indicating a bandwidth part and the terminal equipment ignores the indication field for indicating the bandwidth part included in the indication information.

Supplement 22. The method according to supplement 19, wherein the indication information includes an indication field for indicating a bandwidth part, and the indication field indicates a second uplink bandwidth part different from the active uplink bandwidth part, i.e. the first uplink bandwidth part.

Supplement 23. The method according to supplement 22, wherein the method further includes:
in a case where the terminal equipment is configured to transmit the uplink transmission by using interlaced frequency-domain resources, the terminal equipment expects or determines that a subcarrier spacing (SCS) of the first uplink bandwidth part and a subcarrier spacing of the second uplink bandwidth part are identical.

Supplement 24. The method according to supplement 23, wherein the method further includes:
further expecting or determining by the terminal equipment that the number of resource block sets on the first uplink bandwidth part and the number of resource block sets on the second uplink bandwidth part are identical.

Supplement 25. The method according to supplement 22, wherein the method further includes:
ignoring the indication field used to indicate the resource block set in the indication information by the terminal equipment.

Supplement 26. The method according to supplement 22, wherein the method further includes:
determining frequency-domain resources on the second uplink bandwidth part for transmitting the uplink transmission by the terminal equipment according to the subcarrier spacings of the first uplink bandwidth part and the subcarrier spacing of the second uplink bandwidth part and/or the number of resource block sets included therein.

Supplement 27. The method according to supplement 26, wherein the terminal equipment determines an actual FRDA bit number of the first uplink bandwidth part and an assumed FRDA bit number of the second uplink bandwidth part, and determines the frequency-domain resource for transmitting the uplink transmission on the second uplink bandwidth part according to the actual FRDA bit number and the assumed FRDA bit number.

Supplement 28. The method according to supplement 22, wherein the terminal equipment indicates the interlaced frequency resources by using at least one bit in the FRDA indication field of the indication information for indicating resource block sets, and indicates the resource block sets by using at least one bit in the FRDA indication field of the indication information for indicating interlaced frequency resources.

Supplement 29. The method according to supplement 28, wherein the terminal equipment ignores at least one bit in the FRDA indication field of the indication information.

Supplement 30. The method according to any one of supplements 26-29, wherein,
min(X1+Y1, X2+Y2) bits in the FRDA indication field of the indication information are used to indicate the frequency-domain resources on the second uplink bandwidth part; wherein min( ) denotes a smaller value operation, X1 and Y1 are the actual FRDA bit number of the first uplink bandwidth part, and X2 and Y2 are the assumed FRDA bit number of the second uplink bandwidth part.

Supplement 31. The method according to supplement 30, wherein a least significant bit (LSB) of min (X1+Y1, X2) is used to indicate an interlaced frequency-domain resource, and a most significant bit (MSB) of min (X1+Y1−min (X1+Y1, X2), Y2) is used to indicate a resource block set.

Supplement 32. The method according to supplement 31, wherein if X1+Y1<X2, an interlaced frequency-domain resource that may be indicated by the LSB of min (X1+Y1, X2) is one of former predefined 2^ min (X1+Y1, X2) interlaced frequency-domain resources to which the second uplink bandwidth part corresponds;
and if X1+Y1−min (X1+Y1, X2)<Y2, a resource block set that may be indicated by the MSB of min (X1+Y1−min (X1+Y1, X2), Y2) is one of former predefined 2^ min (X1+Y1−min (X1+Y1, X2), Y2) resource block sets to which the second uplink bandwidth part corresponds.

Supplement 33. The method according to any one of supplements 26-29, wherein,
min (X1, X2)+min (Y1, Y2) bits in the FRDA indication field of the indication information are used to indicate the frequency-domain resources on the second uplink bandwidth part; wherein min( ) denotes a smaller value operation, X1 and Y1 are the actual FRDA bit number of the first uplink bandwidth part, and X2 and Y2 are the assumed FRDA bit number of the second uplink bandwidth part.

Supplement 34. The method according to supplement 33, wherein min (X1, X2) bits in X1 are used to indicate an interlaced frequency-domain resource, and min (Y1, Y2) bits in Y1 are used to indicate a resource block set.

Supplement 35. The method according to supplement 34, wherein if X1<X2, an interlaced frequency-domain resource that may be indicated by min (X1, X2) is one of former predefined min (X1, X2) interlaced frequency-domain resources to which the second uplink bandwidth part corresponds;

and if Y1<Y2, a resource block set that may be indicated by min (Y1, Y2) is one of former predefined $2^{\min(Y1, Y2)}$ bits, Y2) resource block sets to which the second uplink bandwidth part corresponds.

Appendix 36. An uplink transmission method, including:
receiving, by a terminal equipment, first configuration information for indicating a guard band and/or a resource block set of an uplink carrier; and
determining resource blocks included in the resource block set on the uplink carrier by the terminal equipment according to a frequency-domain position of a starting resource block and/or a frequency-domain position of an ending resource block of the guard band.

Supplement 37. The method according to supplement 36, wherein the first configuration information further indicates that there exists no guard band.

Supplement 38. The method according to supplement 36 or 37, wherein the method further includes:
in a case where the first configuration information indicates that there exists no guard band, determining that resource blocks included in a resource subset of the uplink carrier are predefined.

Supplement 39. The method according to supplement 37, wherein the first configuration information indicates that there exists no guard band via a specific value.

Supplement 40. The method according to supplement 36 or 37, wherein the first configuration information includes information for indicating a frequency domain position (such as a CRB index) of a starting resource block of the guard band and/or a frequency-domain position of an ending resource block of the guard band, wherein the frequency-domain position of the starting resource block of the guard band indicated by the information is higher than or equal to the frequency-domain position of the ending resource block of the guard band.

Supplement 41. The method according to supplement 40, wherein a starting common resource block (CRB) index is equal to an ending CRB index plus 1.

Supplement 42. The method according to supplement 36 or 37, wherein the method further includes:
receiving second configuration information for indicating a resource block set of the uplink carrier by the terminal equipment.

Supplement 43. An uplink transmission method, including:
receiving first configuration information for indicating a guard-band and/or a resource block set (RB set) of an uplink carrier by a terminal equipment; and
receiving third configuration information of the UL BWP of the uplink carrier by a terminal equipment;
and if the first configuration information indicates that there exists no guard band, the third configuration information does not include information instructing the terminal equipment to transmit the uplink transmission by using interlaced frequency-domain resources; or, if the third configuration information includes the information instructing the terminal equipment to transmit the uplink transmission by using interlaced frequency-domain resources, the first configuration information does not indicate that there exists no guard band.

Supplement 44. The method according to any one of supplements 36-43, wherein the first configuration information includes intraCellGuardBandUL-r16.

Supplement 45. An uplink transmission method, including:
receiving indication information for scheduling a terminal equipment to transmit uplink transmission by the terminal equipment in a case where the terminal equipment is indicated that there is no frequency guard band, wherein the indication information does not include an indication field for indicating a resource block set.

Supplement 46. The method according to supplement 45, wherein whether there exists a frequency guard band is indicated by intraCellGuardBandUL-r16.

Supplement 47. An uplink transmission method, including:
receiving indication information indicating resources used by a terminal equipment in transmitting uplink transmission; and
in a case where a downlink carrier is configured as having no guard band, taking a predetermined number of resource blocks in a downlink bandwidth part (DL BWP) as a predefined or preconfigured resource block set, and transmitting the uplink transmission on the predefined or preconfigured resource block set.

Supplement 48. A terminal equipment, including a memory and a processor, the memory storing a computer program, and the processor being configured to execute the computer program to carry out the uplink transmission method as described in any one of supplements 1-47.

Supplement 49. A communication system, including the terminal equipment as described in supplement 48.

What is claimed is:

1. An uplink transmission apparatus, comprising:
a receiver configured to receive indication information, the indication information scheduling uplink (UL) transmission on uplink bandwidth part (UL BWP) comprising at least two resource block (RB) sets; and
a transmitter configured to transmit the uplink transmission on a default RB set in the UL BWP,
wherein the information does not include an indication field used for indicating RB set allocated for the UL transmission,
the receiver further configured to receive configuration information for intra-cell guard band and/or RB set of an UL carrier and configuration information for the UL BWP on the carrier, and
the UL BWP includes integer number of RB sets of the carrier, the start RB of the UL BWP being same as the start RB of the RB set with lowest RB set index in the UL BWP and the end RB of the UL BWP being same as the end RB of the RB set with highest RB set index in the UL BWP.

2. The apparatus according to claim 1, wherein the indication information comprises: downlink control information having a downlink control information format 0_0; wherein the downlink control information is scrambled by a C-RNTI or a CS-RNTI or an MCS-C-RNTI.

3. The apparatus according to claim 2, wherein, the default RB set is:
an RB set in the UL BWP and corresponding to the frequency resource used for transmitting the indication information; or
an RB set with lowest RB set index in the UL BWP; or
an RB set with lowest frequency location in the UL BWP.

4. The apparatus according to claim 1, wherein the indication information comprises: a random access response (RAR) in a random access procedure, or downlink control information having a downlink control information format 0_0 and scrambled by a TC-RNTI.

5. The apparatus according to claim 4, wherein the default RB set is:
an RB set in the UL BWP and used for transmitting the PRACH corresponding to the UL transmission.

6. The apparatus according to claim 1, wherein the UL transmission is a PUSCH transmission.

7. The apparatus according to claim 1, wherein the configuration information for the intra-cell guard band and/or RB set of the UL carrier indicates no intra-cell guard band for the UL carrier.

8. An uplink transmission apparatus, comprising:
a receiver configured to receive indication information, the indication information scheduling uplink (UL) transmission on an uplink bandwidth part (UL BWP) comprising at least two resource block (RB) sets; and
a transmitter configured to transmit the uplink transmission on a default RB set in the UL BWP,
wherein the indication information does not include an indication field used for indicating RB set allocated for the UL transmission,
the receiver further configured to receive configuration information for intra-cell guard band and/or RB set of an UL carrier and configuration information for the UL BWP on the carrier, and
an RB set has an RB set index for the carrier and an RB set index for the UL BWP, RB sets being indexed in the order of frequency location and an RB set with lowest frequency location having lowest RB index.

9. An uplink transmission apparatus comprising:
a transmitter configured to transmit indication information, the indication information scheduling uplink (UL) transmission on an uplink bandwidth part (UL BWP) comprising at least two resource block (RB) sets; and
a receiver configured to receive the uplink transmission on a default RB set in the UL BWP,
wherein the indication information does not include an indication field used for indicating RB set allocated for the UL transmission,
the transmitter is further configured to transmit configuration information for intra-cell guard band and/or RB set UL carrier and configuration information for the UL BWP on the carrier, and
the UL BWP includes integer number of RB sets of the carrier, the start RB of the UL BWP being same as the start RB of the RB set with lowest RB set index in the UL BWP and the end RB of the UL BWP being same as the end RB of the RB set with highest RB set index in the UL BWP.

10. The apparatus according to claim 9, wherein the indication information comprises: downlink control information having a downlink control information format 0_0; wherein the downlink control information is scrambled by a C-RNTI or a CS-RNTI or an MCS-C-RNTI.

11. The apparatus according to claim 10, wherein, the default RB set is:
an RB set in the UL BWP and corresponding to the frequency resource used for transmitting the indication information; or
an RB set with lowest RB set index in the UL BWP; or
an RB set with lowest frequency location in the UL BWP.

12. The apparatus according to claim 9, wherein the indication information comprises: a random access response (RAR) in a random access procedure, or downlink control information having a downlink control information format 0_0 and scrambled by a TC-RNTI.

13. The apparatus according to claim 12, wherein the default RB set is:
an RB set in the UL BWP and used for transmitting the PRACH corresponding to the UL transmission.

14. The apparatus according to claim 9, wherein the UL transmission is a PUSCH transmission.

15. The apparatus according to claim 9, wherein the configuration information for the intra-cell guard band and/or RB set of the UL carrier indicates no intra-cell guard band for the UL carrier.

16. An uplink transmission apparatus, comprising:
a transmitter configured to transmit indication information, the indication information scheduling uplink (UL) transmission on an uplink bandwidth part (UL BWP) comprising at least two resource (RB) sets; and
a receiver configured to receive the uplink transmission on a default RB set in the UL BWP,
wherein the indication information does not include an indication field used for indicating RB set allocated for the UL transmission,
the transmitter is further configured to transmit configuration information for intra-cell guard band and/or RB set of an UL carrier and configuration information for the UL BWP on the carrier, and
an RB set has an RB set index for the carrier and an RB set index for the UL BWP, RB sets being indexed in the order of frequency location and an RB set with lowest frequency location having lowest RB index.

* * * * *